(12) United States Patent
Sutter et al.

(10) Patent No.: US 9,006,644 B2
(45) Date of Patent: Apr. 14, 2015

(54) MONOLAYER AND/OR FEW-LAYER GRAPHENE ON METAL OR METAL-COATED SUBSTRATES

(71) Applicant: Brookhaven Science Associates, LLC, Upton, NY (US)

(72) Inventors: Peter Werner Sutter, Westhampton Beach, NY (US); Eli Anguelova Sutter, Westhampton Beach, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 48 days.

(21) Appl. No.: 13/847,566

(22) Filed: Mar. 20, 2013

(65) Prior Publication Data
US 2013/0334410 A1 Dec. 19, 2013

Related U.S. Application Data

(62) Division of application No. 12/753,281, filed on Apr. 2, 2010.

(60) Provisional application No. 61/166,512, filed on Apr. 3, 2009.

(51) Int. Cl.
| | |
|---|---|
| *H01S 1/00* | (2006.01) |
| *H05H 3/00* | (2006.01) |
| *B82Y 30/00* | (2011.01) |
| *B82Y 40/00* | (2011.01) |
| *C01B 31/04* | (2006.01) |
| *G02B 1/10* | (2006.01) |
| *G02B 5/10* | (2006.01) |
| *H01J 3/14* | (2006.01) |

(52) U.S. Cl.
CPC *H05H 3/00* (2013.01); *B82Y 30/00* (2013.01); *B82Y 40/00* (2013.01); *C01B 31/0461* (2013.01); *C01B 2204/04* (2013.01); *G02B 1/105* (2013.01); *G02B 5/10* (2013.01); *H01J 2201/30461* (2013.01); *H01J 3/14* (2013.01)

(58) Field of Classification Search
CPC ....... G02B 5/08; G02B 5/0808; G02B 5/0858
USPC ................................ 428/912.2; 359/838–884
See application file for complete search history.

(56) References Cited

U.S. PATENT DOCUMENTS

| | | | | |
|---|---|---|---|---|
| 4,256,372 | A * | 3/1981 | Yasukuni et al. | 359/275 |
| 7,071,258 | B1 * | 7/2006 | Jang et al. | 524/496 |
| 2006/0216222 | A1 * | 9/2006 | Jang | 423/448 |

(Continued)

OTHER PUBLICATIONS

Pan, Y. et al, "Millimeter-scale, highly ordered single crystalline graphene grown on Ru(0001) surface," Materials Science (2007) 0001, 11-22 (Pan).*

(Continued)

*Primary Examiner* — Jennifer L. Doak
(74) *Attorney, Agent, or Firm* — Dorene M. Price; Lars O. Husebo

(57) ABSTRACT

Disclosed is monolayer and/or few-layer graphene on metal or metal-coated substrates. Embodiments include graphene mirrors. In an example, a mirror includes a substrate that has a surface exhibiting a curvature operable to focus an incident beam onto a focal plane. A graphene layer conformally adheres to the substrate, and is operable to protect the substrate surface from degradation due to the incident beam and an ambient environment.

10 Claims, 12 Drawing Sheets

(56) References Cited

U.S. PATENT DOCUMENTS

| | | | |
|---|---|---|---|
| 2007/0187694 A1* | 8/2007 | Pfeiffer | 257/76 |
| 2010/0021708 A1* | 1/2010 | Kong et al. | 428/220 |
| 2010/0079845 A1* | 4/2010 | Wang et al. | 359/273 |

OTHER PUBLICATIONS

P. Sutter, et. al. A High-Reflectivity, Ambient-Stable Graphene Mirror for Neutral Atomic and Molecular Beams, Applied Physics Letters 99, 211907 (2011) available at http://dx.doi.org.*

* cited by examiner

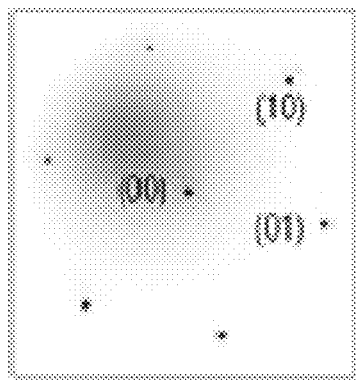 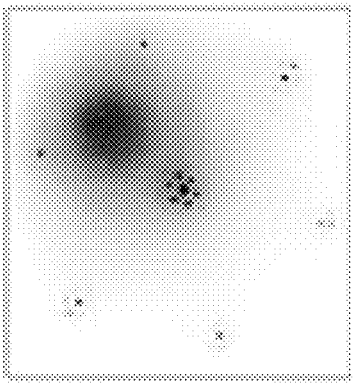 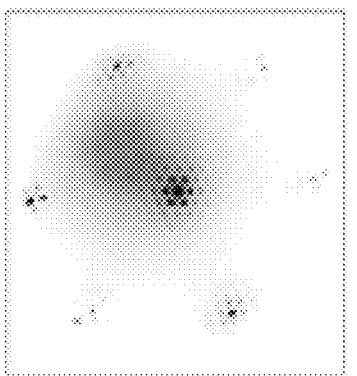
Fig. 1C  Fig. 1D  Fig. 1E
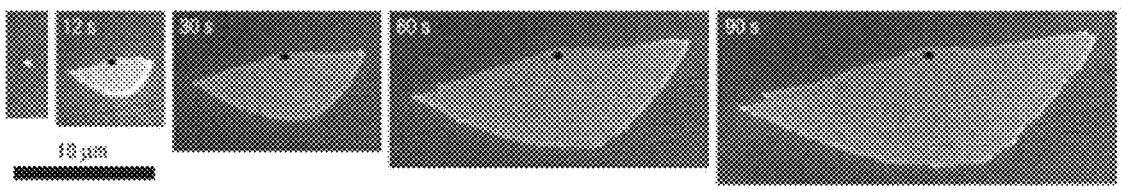
Fig. 2A
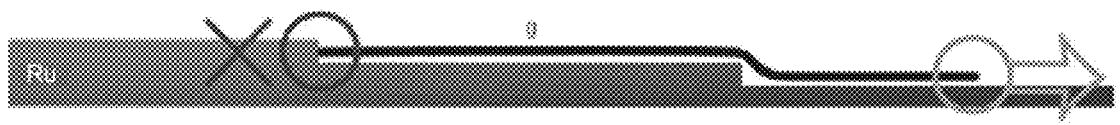
Fig. 2B

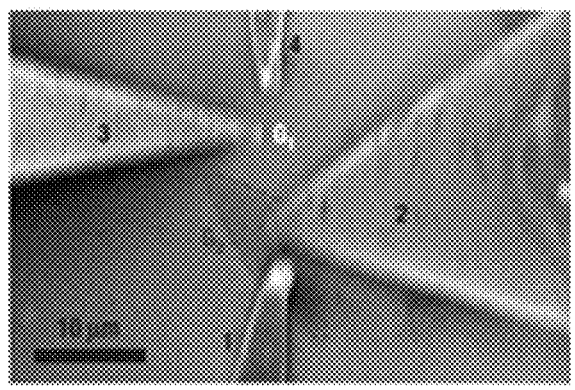
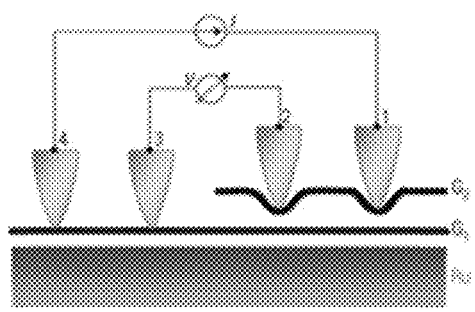
Fig. 5A     Fig. 5B
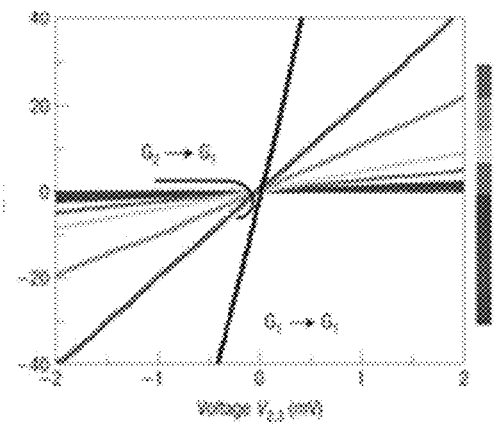
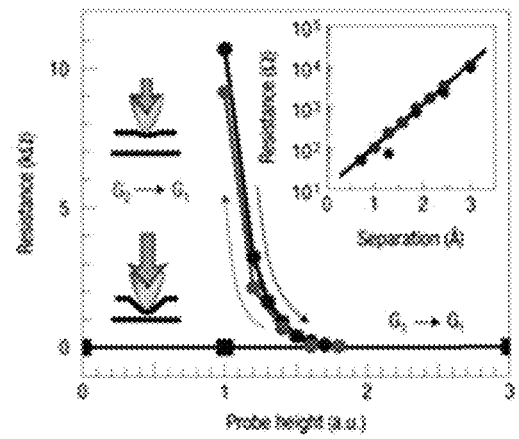
Fig. 5C     Fig. 5D
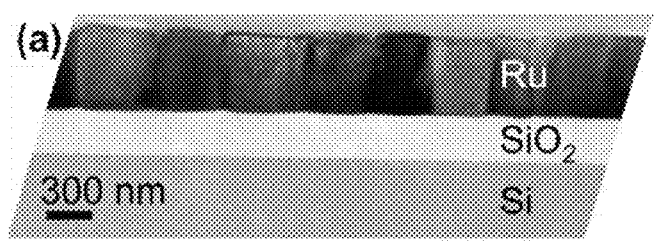
Fig. 6A Fig. 8D                    Fig. 8E

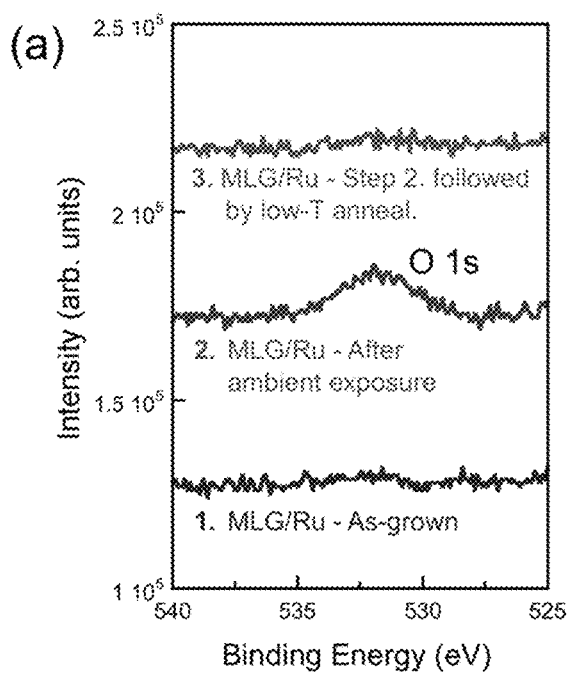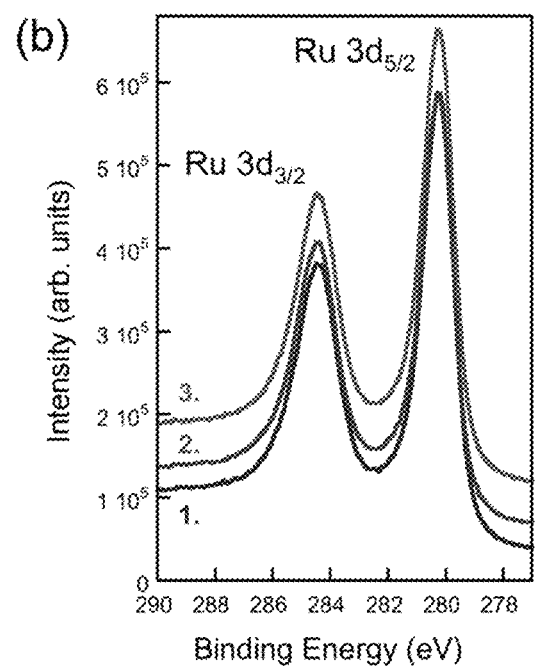
Fig. 14A
Fig. 14B

MONOLAYER AND/OR FEW-LAYER GRAPHENE ON METAL OR METAL-COATED SUBSTRATES

CROSS-REFERENCE TO RELATED APPLICATION

This application is a divisional application of copending U.S. patent application Ser. No. 12/753,281, filed on Apr. 2, 2010, which claims priority under 35 U.S.C. §119(e) to U.S. Provisional Patent Application No. 61/166,512, filed Apr. 3, 2009, both of which are incorporated herein by reference in their entirety.

STATEMENT OF GOVERNMENT RIGHTS

This invention was made with Government support under contract number DE-AC02-98CH10886, awarded by the U.S. Department of Energy. The Government has certain rights in the invention.

BACKGROUND

I. Field of the Invention

This invention relates generally to the formation of graphene. In particular, the present invention relates to the growth of large-area, structurally perfect monolayer and/or few-layer graphene domains on metal or metal-decorated substrates. In this context, "few-layer graphene" should be understood as a number of graphene layers stacked atop one another that continue to display the unique properties of graphene rather than those of graphite. This invention further relates to the utilization of the as-produced graphene layers in electronic devices, as sensors, as catalysts, or for mechanical purposes.

II. Background of the Related Art

Theoretical analyses have previously been used to demonstrate that two-dimensional (2D) crystal structures are thermodynamically unstable and, hence, should not exist. This is seemingly supported by the experimental observation that the melting temperature of thin films decreases with decreasing thickness. For many material systems, thin films with thicknesses on the order of several atomic layers tend to form three-dimensional (3D) clusters on the surface. However, theory and experiment were flaunted by the discovery of graphene, a planar sheet of $sp^2$-bonded carbon (C) atoms which is one atomic layer thick. In graphene, the C atoms are densely packed into a 2D honeycomb lattice that exhibits a wealth of exceptional electronic and physical properties. A review of graphene is provided, for example, by A. K. Geim, et al. in "*The Rise of Graphene*," Nature Materials 6, 183 (2007) and in "*Graphene: Exploring Carbon Flatland*," Physics Today, Vol. 60, No. 8, p. 35 (2007) each of which, along with the references cited therein, is incorporated by reference in its entirety as if fully set forth in this specification.

Graphene can be considered as a single carbon layer which has been extracted from the plurality of loosely bound layers that constitute graphite. Alternatively, graphene can be considered as arising from a single-walled carbon nanotube which has been cut along its length and unrolled into a single sheet. Graphene has been shown to be a zero-bandgap material whose charge carriers behave as massless Dirac fermions. It has remarkably high room-temperature carrier mobility with individual charge carriers exhibiting long range ballistic transport. Nanoscale ribbons of graphene exhibit quantum confinement, and the capability for single-molecule gas detection has been demonstrated using graphene. Its physical properties are equally impressive; measurements probing the intrinsic strength of a sheet of graphene reveal that it is the strongest known material.

These remarkable properties make graphene suitable for a wide variety of applications. Potential applications in electronics include use of graphene as a new channel material for field-effect transistors (FETs) and as a conductive sheet in the fabrication of single-electron transistor (SET) circuitry. Another potential application is graphene-based composite materials in which a graphene powder is dispersed within a polymer matrix. Graphene powder may also find applications in batteries, as field emitters in plasma displays, or as a catalyst due to its extraordinarily high surface area. Single graphene sheets have exceptionally low-noise electronic characteristics, thereby lending the possibility of their use as probes capable of detecting minuscule changes in external charge, magnetic fields, or mechanical strain.

Despite the extraordinary potential of graphene, realization of practical applications which exploit its unique properties requires the development of reliable methods for fabricating large-area, single-crystal, and defect-free graphene domains. Recent attempts to produce monolayer and/or few-layer graphene have involved, for example, mechanical exfoliation of graphite crystals, thermal decomposition of silicon carbide (SiC) at elevated temperatures, reduction of graphene oxide in hydrazine, and epitaxial growth on transition metal surfaces. However, each of these methods suffers from a number of drawbacks, including an inability to efficiently and reproducibly form large (>100 μm) single-crystal domains in quantities sufficient for large-scale fabrication. Consequently, the formation of graphene domains with uniform thicknesses and length scales sufficient for practical applications remains a challenge.

SUMMARY

In view of the above-described problems, needs, and goals, some embodiments of the present invention provide a method of forming structurally perfect graphene domains with uniform thicknesses over large areas. Other embodiments of the present invention produce single- and few-layer graphene domains with linear dimensions of up to 200 μm or more. In this context, "few-layer graphene" refers to a number of graphene layers stacked atop one another that display the unique properties of graphene rather than those of the more common graphite. In one embodiment of the present invention such layers are achieved by controlling the temperature-dependent solubility of interstitial carbon in a transition metal substrate. At elevated temperatures, C is incorporated into the bulk of the metal at higher concentrations. Slow cooling lowers the interstitial C solubility, thereby driving a significant amount of C to the transition metal surface to nucleate graphene islands, which, with continued cooling, gradually increase in size. The graphene layers so formed comprise two-dimensional hexagonal array of carbon atoms, the graphene layer substantially free of defects. These 2D arrays may have lateral extents greater than about 20 μm in two orthogonal directions in the plane of the graphene layer, and up to about 200 μm.

In this embodiment, the metal preferably includes, but is not limited to, any transition metal or alloy that exhibits a large change in C solubility with changing temperature. The surface lattice parameter of the transition metal is preferably matched to that of graphene, having a lattice mismatch of ≤15%. The growth surface is not limited to a particular crystallographic plane or surface structure, but preferably exhibits a hexagonal crystal structure, thereby providing a template for graphene growth. The surface preferably is atomically smooth with a step spacing that permits nucleation of graphene layers followed by growth via C incorporation along the edges of the graphene layer. The growth process is continuous, such that the graphene layer propagates across terraces and over step edges in the "downhill" direction during growth. Additional C layers may nucleate and grow on top of or beneath the first and/or subsequent layers to produce a plurality of graphene layers sequentially stacked one on top of the other.

In another embodiment a surface template for graphene growth may be provided by a suitable transition metal or alloy layer formed on a supporting substrate. The substrate is not limited to any particular material, but must be able to support the transition metal or alloy. That is, the underlying substrate must have physical and chemical properties which facilitate the formation of a suitable transition metal or alloy overlayer which then serves as a surface template for graphene growth.

In an especially preferred embodiment the transition metal substrate is ruthenium (Ru) and the growth plane is the Ru(0001) crystal surface. The Ru(0001) surface is initially cleaned by repeated cycles of $Ar^+$ ion bombardment and high-temperature annealing in an ultrahigh vacuum (UHV) or high vacuum (HV) process chamber. This is followed by heating to 950° C. to 1250° C. and then slowly cooling to 700° C. to 900° C. Since the melting temperature ($T_M$) of Ru is approximately 2334° C., or 2607 K, this heat treatment is equivalent to heating the Ru to about 47% to 60% of $T_M$ followed by cooling to 37% to 45% of $T_M$. More generally, the transition metal can be heated to about $0.5(T_M)$ for several seconds to several minutes followed by slow (less than or equal to about 20° C. per minute) cooling to 0.3 to $0.4(T_M)$. As the Ru(0001) surface cools, graphene nucleates at random sites on the surface and the size of the graphene domain increases gradually with decreasing temperature as C atoms are continually incorporated along the edges of the graphene layer. This results in graphene domains with linear dimensions preferably in excess of 200 μm.

In some embodiments, the substrate and/or the transition metal or alloy film may deviate from planarity. In some cases, this deviation may be a curvature whose radius is of the order of, or greater than, that of the lateral dimensions of the graphene domains. In other cases, the substrate may exhibit curvature whose radius is significantly smaller than the lateral dimensions of the graphene domains. The substrate curvature may have a radius on the order of 100 μm, or greater or less than that depending on the particular application.

In yet another embodiment, second and subsequent layers of graphene nucleate and grow on top of or beneath the preceding layer. The outer layers of such a stack are more loosely bound to the transition metal substrate, thereby facilitating their removal for incorporation in practical applications. These outer graphene layers also exhibit properties more characteristic of free-standing graphene. Transfer of graphene layers may be accomplished by any of a plurality of techniques which may include, for example, oxide overgrowth and removal of the transition metal substrate by etching, or by intercalating a material between a first graphene layer covalently bonded to the transition metal and the metal and then removing the graphene layer.

These and other characteristics of the present invention will become more apparent from the following description and illustrative embodiments which are described in detail with reference to the accompanying drawings. Similar elements in each figure are designated by like reference numbers and, hence, subsequent detailed descriptions thereof may be omitted for brevity.

BRIEF DESCRIPTION OF THE DRAWINGS

FIG. 1C is a selected-area low-energy electron diffraction patterns of the Ru(0001) substrate (electron energy=45.4 eV).

FIG. 1D is a selected-area low-energy electron diffraction patterns of a one-layer epitaxial graphene region (52.2 eV) formed in accordance with the present invention.

FIG. 1E is a selected-area low-energy electron diffraction patterns of a two-layer epitaxial graphene region (39.1 eV) formed in accordance with the present invention.

FIG. 2A shows a time-lapse sequence of low-energy electron microscopy (LEEM) images which reveal the initial growth of a first-layer graphene island on Ru(0001) at 850° C. formed in accordance with the present invention.

FIG. 2B is a schematic cross-sectional view showing the preferential carpet-like expansion of the graphene sheet (g) across "downhill'" steps with suppression of growth in the "uphill" direction.

FIG. 5A is an UHV-SEM image showing the arrangement of four contact probes for interlayer resistance measurements.

FIG. 5B is a schematic illustration of the four-probe transport measurement between first- and second-layer epitaxial graphene ($G_2 \rightarrow G_1$) layers formed in accordance with the present invention, using probes 1 and 2 for local mechanical deformation of $G_2$.

FIG. 5C shows four-probe current-voltage characteristics for $G_1 \rightarrow G_1$ transport and for $G_2 \rightarrow G_1$ transport at different compression of the interlayer spacing of two-layer graphene formed in accordance with the present invention.

FIG. 5D compares the strain dependence of the electrical resistance in $G_1 \rightarrow G_1$ (squares) and $G_2 \rightarrow G_1$ (circles) of two-layer graphene formed in accordance with the present invention; the two G₂→G₁ curves represent mechanical loading and unloading whereas the inset shows exponential scaling of the interlayer resistance with the calculated layer spacing.

FIG. 6A is a cross-sectional TEM (XTEM) image showing the structure of a representative Ru film grown on $SiO_2$.

FIG. 8D is a reciprocal space construction illustrating the relation between the angle of rotation between the Ru and graphene lattices, Θ, and the resulting change in orientation (angle φ) and scaling (from reciprocal vector $b_m$ to $b'_m$) of the moiré structure.

FIG. 8E depicts the theoretical relationship between moiré orientation (φ) and scaling, assuming a continuous graphene sheet flowing across Ru grains with different orientation. Points are measurements at different positions in the area depicted in FIG. 8A.

FIG. 10A shows planar areas and arrays of indents patterned.

FIG. 10B shows an inverted hemisphere.

FIG. 10C shows an inverted tetrahedron.

FIG. 10D shows an inverted square pyramid.

FIG. 14A shows the O 1s XPS spectra from MLG/Ru thin films on fused silica taken from the as-grown layers (spectrum 1), after environmental exposure for several hours (spectrum 2), and after a 30-minute low-temperature annealing step following the environmental exposure (spectrum 3).

FIG. 14B shows the Ru 3d XPS spectra from MLG/Ru thin films on fused silica taken from the as-grown layers (spectrum 1), after environmental exposure for several hours (spectrum 2), and after a 30-minute low-temperature annealing step following the environmental exposure (spectrum 3).

DETAILED DESCRIPTION

Figure 1A:
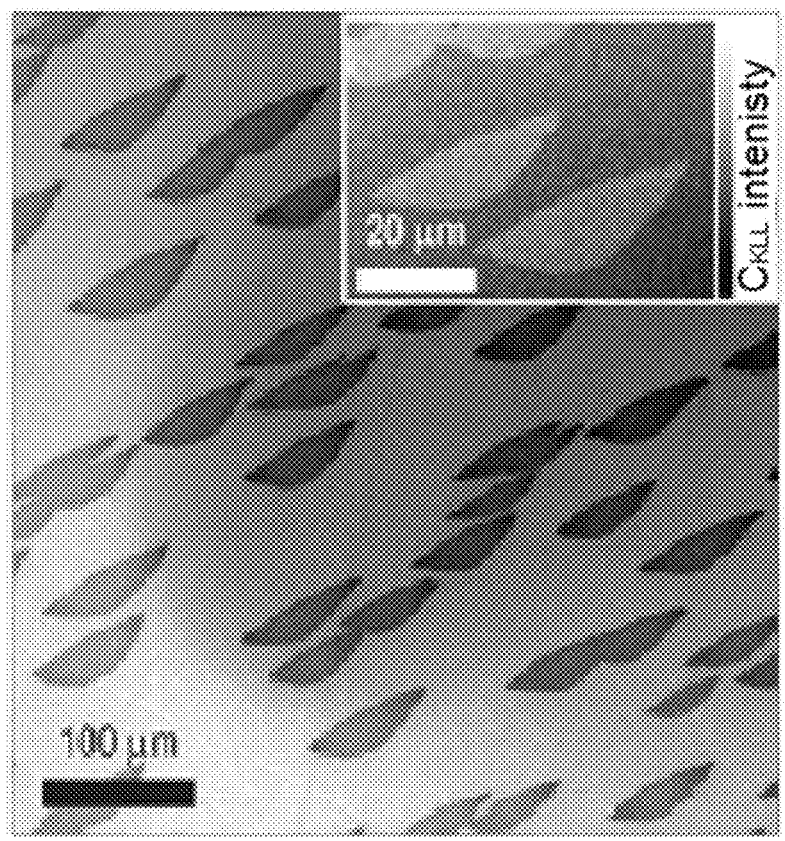
FIG. 1A is an UHV-SEM image of the Ru(0001) surface after first-layer graphene growth in accordance with the present invention; the inset shows a carbon KLL (260.6 eV) UHV scanning Auger microscopy image obtained on the same sample.

In the interest of clarity, in describing the present invention, the following terms and acronyms are defined as provided below.

Definitions

Alloy: A partial or complete solution of two or more elements ex situ: The opposite of in situ. This term is used, in the context of graphene growth, to mean that a process or analysis is performed outside the growth or analytical chamber, before or after growth has been completed.

Graphene: A one-atom-thick planar sheet of $sp^2$-bonded C atoms that are densely packed in a two-dimensional honeycomb crystal lattice. It is the basic structural element of all carbon allotropes.

Graphite: An allotrope of carbon which typically appears black to dark grey, having a metallic luster and greasy feel. It is the native form of carbon and a very common mineral with uses in pencil leads, as a lubricant, or as a refractory material. Graphite is generally comprised of sequentially stacked and loosely bound layers of graphene which are capable of sliding past each other.

in situ: Latin for "in the place." Within the context of graphene growth or analysis this means that a process or analysis is performed within the growth or analytical chamber. Measurements performed within the chamber before, during, or after annealing and without breaking vacuum are termed in situ.

Lattice Spacing: The length of a unit cell along a particular crystallographic direction. The unit cell is the basic structural unit of a crystal structure and is generally defined in terms of atom positions within a parallelepiped volume.

Moiré Pattern: An interference pattern created, for example, when two grids are overlaid at an angle, or when they have slightly different mesh sizes Nanoparticle: An object having at least one dimension between about 1 nm and 100 nm Nanotube: A hollow cylindrical tube with a diameter of about 1 nm to 100 nm and of arbitrary length Nanowire: A wire-like object having a diameter in the nanometer size range. The lateral size is generally constrained to within 1 nm to 100 nm in diameter whereas the longitudinal size is unconstrained Raman Spectroscopy: A spectroscopic technique used to study vibrational, rotational, and other low-frequency modes in a material system. It relies on inelastic or Raman scattering of monochromatic light in the visible, near infrared, or near ultraviolet range Single-domain Graphene: A graphene layer that is fully crystalline, being virtually structurally perfect and defect-free Transition Metal: Any element in the d-block of the periodic table, including zinc, cadmium, and mercury Ultrahigh vacuum: A vacuum wherein the pressure is $\leq 10^{-8}$ Torr High vacuum: A vacuum wherein the pressure is $\leq 10^{-6}$ Torr Acronyms 1D: One-dimensional
2D: Two-dimensional
3D: Three-dimensional
AES: Auger electron spectroscopy
fcc: Face-centered cubic
FET: Field-effect transistor
FOV: Field of view
hcp: Hexagonal close-packed
HRTEM: High-resolution transmission electron microscopy
LEED: Low-energy electron diffraction
LEEM: Low-energy electron microscopy
MLG: Monolayer graphene
PEEM: Photoexcitation electron spectroscopy
SEM: Scanning electron microscope
SET: Single-electron transistor
STM: Scanning tunneling microscope
TEM: Transmission electron microscope
UHV: Ultrahigh vacuum
XRD: X-ray diffraction The present invention is based on the discovery that when a transition metal having at least one crystallographic plane with an atomically smooth surface with crystalline order is subject to a sequence of carefully controlled annealing steps under UHV conditions, single-domain graphene layers with linear dimensions in excess of 200 μm can be formed on the surface. The substrate is not limited to any particular material or surface, but is preferably such that the interstitial solubility of C atoms changes appreciably with temperature, thereby resulting in significant C surface segregation upon cooling. Furthermore, the crystallographic surface plane is preferably matched to graphene, providing a surface lattice and underlying crystal which act as a template for the formation of graphene layers.

In some embodiments the (0001) surface plane of a Ru single crystal was used to investigate the growth of monolayer and/or few-layer graphene during thermal cycling in an UHV chamber. It is to be understood, however, that the growth method described in this specification is not limited to Ru or the Ru(0001) surface, and can also be performed at higher background pressures. Rather, graphene growth on Ru(0001) in UHV is used as a model system which exemplifies the spirit and scope of the present invention. Graphene growth may be performed on any suitable substrate having a surface which is atomically smooth, i.e., consists of atomically flat terraces separated by steps. The crystal structure of the surface is preferably hexagonal, with a lattice parameter matched to that of graphene. The lattice mismatch, as defined by $(a_f - a_s)/a_s$ is preferably $\leq 15\%$ where $a_f$ is the lattice parameter of the film and $a_s$ is that of the substrate. A surface template may be provided, for example, by a transition metal, an alloy, or any other suitable substrate covered by a transition metal or alloy. The metal or alloy preferably has a C solubility which changes appreciably with temperature such that C surface segregation may be induced by varying the substrate temperature. Other non-carbide-forming transition metals may also be used as substrates. See, for example, P. Sutter, J. T. Sadowski, and E. Sutter "Graphene on Pt(111): Growth and substrate interaction," Phys. Rev. B 80, 245411 (2009), which is incorporated by reference herein in its entirety.

The temperature-dependent solubility of interstitial C in Ru was used to achieve controlled layer-by-layer growth of large graphene domains on Ru(0001). The solubility of C in Ru and other noble metals is disclosed, for example, by W. J. Arnoult, et al. in "*The Solubility of Carbon in Rhodium, Ruthenium, Iridium, and Rhenium*," Scr. Metall. 6, 1013 (1972) which is incorporated by reference in its entirety as if fully set forth in this specification. Nucleation and growth of graphene on Ru(0001) was analyzed by in situ surface microscopy with additional characterization being performed by electron scattering, electron microscopy, micro-Raman spectroscopy, and electrical transport measurements. These analytical methods are described in additional detail by P. Sutter, et al. in "*Epitaxial Graphene on Ruthenium*," Nature Mater. 7, 406 (2008) which, along with all references cited therein, is incorporated by reference in its entirety as if fully set forth in this specification.

I. Exemplary Embodiment 1—Growth on Single Crystal Substrates

An exemplary method of forming graphene will now be described in detail. It is to be understood, however, that graphene growth is not limited to the method as described below, but may be accomplished by variations of the present method or by other, equivalent methods. A 99.999% pure Ru(0001) substrate with a miscut of 0.1° was initially cleaned ex situ by ultrasonication in acetone and then isopropyl alcohol followed by a 20 min rinse in deionized water. The substrate was then introduced into an UHV process chamber by means of a suitable load-lock and sample transfer system. A suitable choice of process chamber may be located within an Elmitec LEEM V field-emission LEEM with a sample stage capable of attaining temperatures ranging from 200K to over 1500K at pressures from UHV ($\leq 10^{-9}$ Torr) to over $10^{-6}$ Torr. The LEEM may be equipped for in situ sample analysis using bright/dark field imaging, photoexcitation electron microscopy (PEEM), low-energy electron diffraction (LEED), and microdiffraction.

The Ru(0001) surface was cleaned in situ by repeated cycles of sputtering by $Ar^+$ ions (p(Ar)=$4 \times 10^{-6}$ Torr, 1000 eV) at room temperature for 10 min followed by annealing at 600° C. for 20 min. This produced an atomically smooth, clean, and well-ordered Ru(0001) surface with average terrace widths of ~200 nm (depending on the sample miscut). The Ru substrate was then heated to and maintained at 1,150° C. for 10 min, and exposed to a hydrocarbon gas (ethylene) at $10^{-7}$ to $10^{-6}$ torr to enrich the near-surface Ru lattice with interstitial C atoms. The Ru substrate was allowed to slowly cool from 1,150° C. to 825° C. at a rate of 20° C/min. The continuous decrease in temperature produced a concomitant reduction of the interstitial C solubility by a factor of six. This drove significant amounts of C to the Ru(0001) surface where nucleation of graphene occurred. This produced an array of lens-shaped islands of macroscopic size (>100 μm) covering the entire Ru(0001) surface as shown, for example, by FIG. 1A which is an UHV-SEM image of an area of the Ru(0001) surface. The inset of FIG. 1A is a $C_{KLL}$ UHV scanning AES image which shows that the islands are indeed C-rich and surrounded by Ru metal with a negligible $C_{KLL}$ signal. High initial annealing temperatures during C-loading and graphene growth at temperatures exceeding 800° C. (about 40% of the melting temperature ($T_M$) of Ru) may be key factors leading to sparse nucleation of large, single-crystalline graphene domains desired for applications.

By combining in situ electron microscopy and selected-area electron diffraction (see, e.g., FIGS. 1C-1E), the islands were identified as single-layer epitaxial graphene. On Ru(0001) surfaces, single-layer epitaxial graphene adopts an incommensurate moiré structure as disclosed, for example, by S. Marchini, et al. in "*Scanning Tunneling Microscopy of Graphene on Ru(0001),*" Phys. Rev. B 76, 075429 (2007) which is incorporated by reference in its entirety as if fully set forth in this specification. Diffraction patterns obtained from the Ru(0001) substrate and C islands showed that the $\langle 1 0 \bar{1} 0 \rangle$ directions of layer and substrate aligned, with moiré repeat vectors $a_m$=(2.93±0.08) nm, equivalent to 10.8±0.3 times the nearest-neighbor distance on Ru(0001). A marked lowering of the work function compared with that of both clean Ru and bulk graphite indicated strong substrate bonding and significant charge transfer from the metal to the graphene overlayer.

The interaction of the growing islands with atomic substrate steps may be an important factor in enabling monocrystalline graphene domains with size exceeding the average step spacing by several orders of magnitude. Epitaxial graphene sheets on Ru(000 1) nucleate very sparsely during cooling from high temperatures above 1000° C., and rapidly expand by C incorporation into graphene edge sites. Time-lapse in situ LEEM images which show the initial growth of a first-layer graphene island at 850° C. are provided in FIG. 2A. The numbers in the upper left corner indicate the elapsed time in seconds after the initial nucleation of the graphene island. Ru(0001) substrate steps, which are visible as faint dark lines, are aligned from lower left to upper right. LEEM results show a fast expansion of growing graphene domains parallel to substrate steps and across steps in the "downhill" direction. The black dot marks the position of the initial graphene nucleus, demonstrating negligible growth across steps in the "uphill" direction. The crossing of "uphill" steps by the graphene edge is almost entirely suppressed, leading to a straight boundary that shows virtually no growth. An illustration of the growth process is provided in FIG. 2B which is a schematic cross-sectional view of the stepped Ru surface, showing the preferential carpet-like expansion of the graphene sheet (g) across "downhill" steps with suppression of growth in the "uphill" direction.

Single-layer graphene should interact with a flat metal substrate primarily through hybridization of the out-of-plane π orbitals with metal d bands, whereas in-plane σ states participate in sp² bonding. This picture breaks down when the graphene edge meets a substrate step. The epitaxial orientation on Ru(0001) implies that a graphene sheet projects a zigzag edge with localized dangling σ bonds onto atomic substrate steps. A graphene boundary encountering an "uphill" step maximizes the orbital overlap and becomes immobilized at the step edge. Conversely, a graphene sheet growing in the "downhill" direction shows minimal overlap of the edge states with the Ru step, and can flow uninhibited in a carpet-like fashion across the step, i.e., as depicted in FIG. 2B. This growth mode produces macroscopic graphene domains with sizes well in excess of 100 μm in length as shown, for example, in FIG. 1A. This is far larger than the Ru(0001) step spacing (0.15 μm), exceeding the extension of the largest monocrystalline epitaxial graphene domains reported previously. This represents a two order-of-magnitude increase over the reported domain sizes of <1 μm on 4H-SiC (000$\bar{1}$) and ~1 μm on Ru(0001) and Ir(111) as disclosed by J. Hass, et al. in "*Highly Ordered Graphene for Two Dimensional Electronics,*" Appl. Phys. Lett. 89, 143106 (2006); by A. L. Vazquez de Parga in "*Periodically Rippled Graphene: Growth and Spatially Resolved Electronic Structure,*" Phys. Rev. Lett. 100, 056807 (2008); and by J. Coraux, et al. in "*Structural Coherency of Graphene on Ira (111),*" Nano Lett. 8, 565 (2008), respectively, each of which is incorporated by reference in its entirety as if fully set forth in this specification.

Figure 1B:
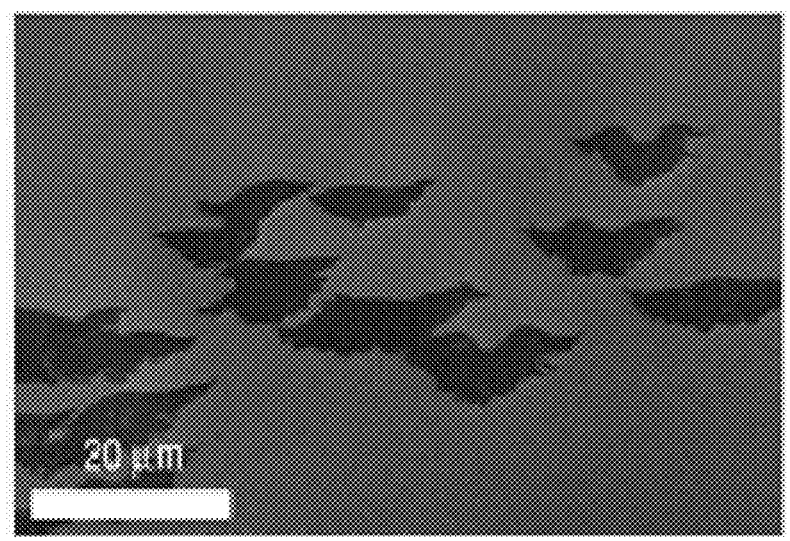
FIG. 1B shows an UHV-SEM image of a group of second-layer graphene islands in accordance with the present invention.

If sufficient C segregates from the Ru bulk or is deposited additionally from a suitable hydrocarbon precursor, e.g., ethylene, the graphene islands may grow to a size corresponding to the spacing of the initial nuclei (≥200 μm) and coalesce to a complete first layer. Each individual graphene domain is structurally perfect, being virtually free of surface defects such as point defects, dislocations, impurities, voids, perturbations, or other types of defects. Graphene growth from an ethylene source gas is described, for example, by T. A. Land, et al. in "*STM Investigation of Single Layer Graphite Structures Produced on Pt(111) by Hydrocarbon Decomposition,*" Surf Sci. 264, 261 (1992) which is incorporated by reference in its entirety as if fully set forth in this specification. At approximately 80% surface coverage the nucleation and growth of islands of a second graphene layer were observed on the macroscopic first-layer domains. This is shown, for example, by FIG. 1B which is an UHV-SEM image of a group of second-layer graphene islands. A smaller separation of second-layer nuclei suggests that the C adatom mobility is lower on first-layer graphene than on Ru(0001). A well-ordered moiré structure was observed by selected-area diffraction patterns obtained from the second layer (FIG. 1E). Diffraction patterns for micrometer-sized areas on bare Ru(0001) and single-layer graphene domains are shown in FIGS. 1C and 1D, respectively. Island edges aligned with the direction of substrate steps indicate a residual interaction between Ru(0001) surface steps and graphene edges, similar to that observed for the first layer.

At this point the surface consists of two different phases. Areas with two-layer graphene coexist with regions covered by a single graphene layer. The first layer is expected to be covalently bonded to the Ru substrate by hybridization of C $2p_z$ orbitals with Ru d states near the Fermi energy. Charge transfer from the substrate to subsequent graphene layers should diminish progressively, with the interlayer coupling asymptotically approaching the van der Waals interaction of bulk graphite. Assessing this transition is of central importance for evaluating epitaxy on transition metals as a scalable synthesis route of one- or few-layer material with the unique electrical properties of graphene. A combination of structural, vibrational, and electronic probes on individual single- and two-layer domains have been used to address this issue.

The spacing between first- and second-layer graphene layers was determined by intensity-voltage (I(V)) LEEM, which is a technique capable of structural fingerprinting in submicrometer surface areas. I(V) LEEM is described in further detail by, for example, A. K. Schmid, et al. in "*The Chemistry of Reaction-Diffusion Fronts Investigated by Microscopic LEED I-V Fingerprinting,*" Surf. Sci. Part 1 331-333, 225 (1995) which is incorporated by reference in its entirety as if fully set forth in this specification. Local I(V) characteristics were obtained from real-space images of uniform Ru metal, one-layer graphene, and two-layer graphene, being acquired as a function of incident electron energy. Spectroscopic stacks of images of a surface were acquired from the (00) diffraction beam as a function of electron energy V so that the local image intensity I(V) represents the specular low-energy electron reflectivity of a given surface domain. When combined with dynamic multiple scattering calculations of the low-energy electron reflectivity, this information can be used to determine the spacings of the graphene layer stacks.

Layer spacings were determined by comparing measured I(V) characteristics for the specular diffracted beam at very low electron energies (1-40 eV) with simulations by dynamical multiple-scattering low-energy electron diffraction theory. As an approximation to the incommensurate moiré structure observed experimentally, the simulations assumed graphene fully strained to the Ru substrate, with C atoms occupying hexagonal close-packed (hcp) and face-centered cubic (fcc) hollow sites. In this manner, it is possible to achieve faithful representation of the out-of-plane layer separations at reasonable computational efficiency. This method is applied to bare Ru(0001) as well as single- and two-layer epitaxial graphene on Ru(0001) with the results being provided in FIGS. 3A through 3C, respectively. Plan-view atomic models of the simulated structures are shown adjacent to the spectra in FIGS. 3A through 3C.

Figure 3A:
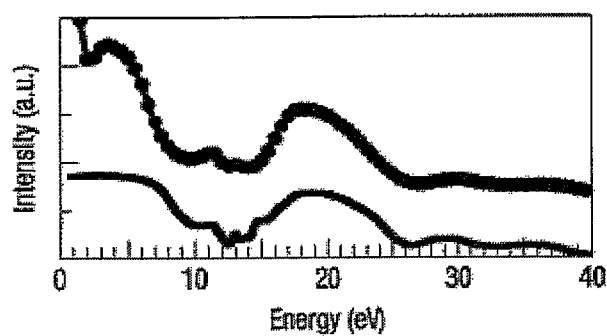
FIG. 3A shows measured (top) and simulated (bottom) low-energy electron reflectivity, I(V), of the Ru(0001) substrate, with a corresponding plan-view model of the simulated structure shown at the right.
Figure 3A:
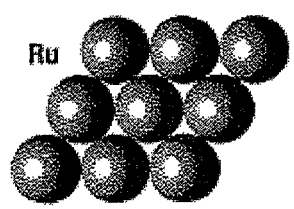
Figure 3B:
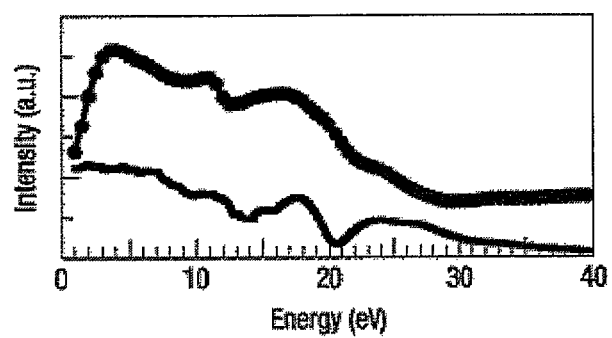
FIG. 3B shows measured (top) and simulated (bottom) low-energy electron reflectivity, I(V), of the one-layer epitaxial graphene formed in accordance with the present invention, with corresponding a plan-view model of the simulated structure shown at the right.
Figure 3B:
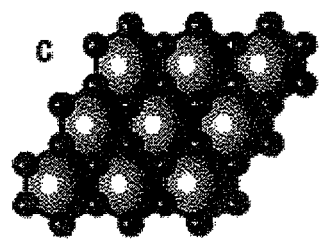
Figure 3C:
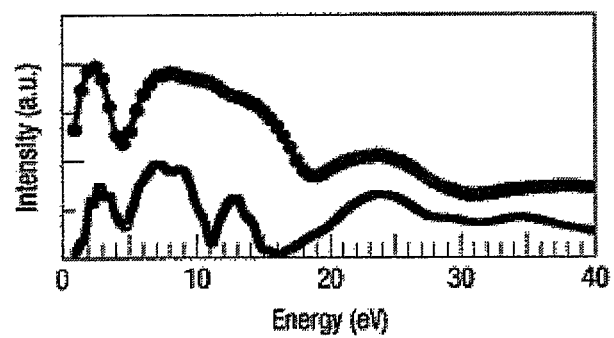
FIG. 3C shows measured (top) and simulated (bottom) low-energy electron reflectivity, I(V), of the two-layer epitaxial graphene formed in accordance with the present invention, with a corresponding plan-view model of the simulated structure shown at the right.
Figure 3C:
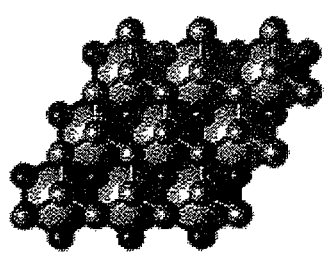

Measured and simulated I(V) curves are in excellent agreement for the Ru(0001) surface as shown in FIG. 3A. On graphene, a best fit between experimental and theoretical I(V) curves is obtained for a unique set of layer spacings. A separation of (1.45±0.1) Å between the Ru substrate and the first graphene layer and a larger spacing of (3.0±0.1)Å between the first and second layer in Bernal (A-B) stacking are obtained as shown in FIGS. 3B and 3C, respectively. The addition of the second layer has negligible influence on the separation between the first graphene layer and the metal, which remains fixed at 1.45 Å. This close spacing reflects the strong bonding interaction between Ru and the first graphene layer. For the second layer, however, the interlayer spacing is close to that of bulk graphite (3.34 Å), suggesting that the electronic structure of this and subsequent graphene layers are minimally affected by the adjacent metal substrate.

Raman spectroscopy was used to probe the consequences of this gradual decoupling on the vibrational and electronic properties of transition-metal-supported graphene stacks. Micro-Raman spectra and Raman maps were obtained on both epitaxial graphene on Ru(0001) and on a reference sample of mechanically cleaved monolayer graphene in a commercial confocal Raman microscope (WiTec). An excitation wavelength of 532 nm at incident power below 1 mW and a ×100 objective providing a diffraction-limited spot size of about 400 nm were used. Raman maps were acquired by measuring complete spectra on a 0.5 µm grid over a 25 µm×25 µm sample area.

Raman spectra on cleaved monolayer and few-layer graphene on $SiO_2$, which served as reference samples, show two primary features: a G band at ~1,580 $cm^{-1}$ due to the two-fold degenerate $E_{2g}$ mode at the zone centre, and a second-order D* (2D) band at ~2,700 $cm^{-1}$ due to phonons in the highest optical branch near the K point at the Brillouin zone boundary. This is shown, for example, by the upper plot in FIG. 4A. The 2D band results from a double-resonance process, which links the phonon wave vectors to the electronic band structure. That is, its line shape can serve as a fingerprint of the electronic structure of massless Dirac fermions of monolayer or few-layer graphene.

Figure 4A:
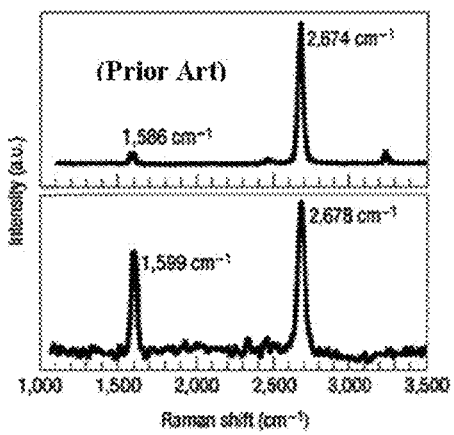
FIG. 4A shows a comparison of Raman spectra at 532 nm for (Prior Art) mechanically cleaved monolayer graphene on $SiO_2$ (top) and epitaxial two-layer graphene on Ru(0001) (bottom) formed in accordance with the present invention.
Figure 4B:
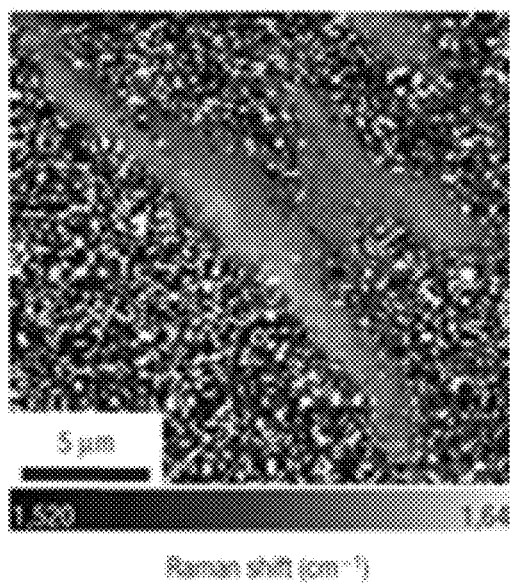
FIG. 4B is a Raman map showing the peak energy of the G for two adjacent two-layer epitaxial graphene islands.
Figure 4C:
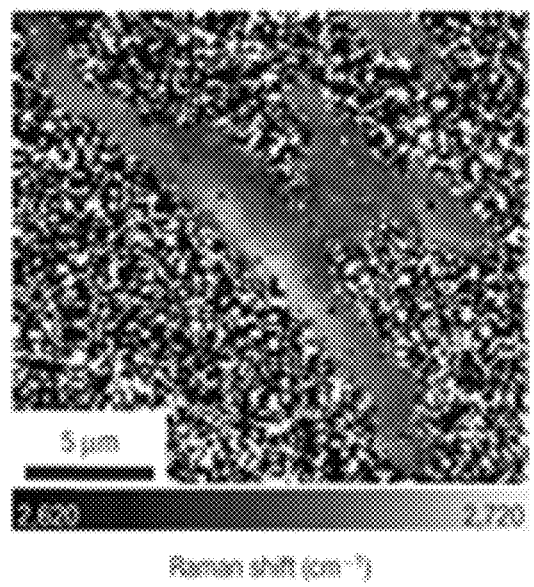
FIG. 4C is a Raman map showing the peak energy of the 2D band for two adjacent two-layer epitaxial graphene islands.

The micro-Raman measurements at 532 nm excitation on single- and two-layer epitaxial graphene on Ru(0001) are summarized in FIGS. 4A through 4C. The dominant band of the Ru substrate is the transverse-optical zone-centre phonon mode at ~190 $cm^{-1}$ as disclosed, for example, by H. Olijnyk, et al. in "*On Optical Phonons and Elasticity in the hcp Transition Metals Fe, Ru and Re at High Pressure*," Europhys. Lett. 53, 504 (2001) which is incorporated by reference in its entirety as if fully set forth in this specification. Samples with a single epitaxial graphene layer show no detectable Raman intensity between 1,000 $cm^{-1}$ and 3,000 $cm^{-1}$. With the addition of the second graphene layer, peaks appear at frequencies close to those of the G and 2D bands as shown by the lower plot in FIG. 4A. Both bands give rise to narrow single peaks, which are shifted to higher energy by 13 $cm^{-1}$ and 4 $cm^{-1}$, respectively, compared with the same bands in mechanically cleaved monolayer graphene. In Raman maps (FIGS. 4B and 4C), the center position and width of these bands remains constant over large areas within two-layer epitaxial graphene domains which are several square micrometers in size. The maps in FIGS. 4B and 4C were obtained by Lorentzian fits to the G and 2D Raman bands, and plotting the spatial distribution of the Raman shifts of these bands. A local blueshift by ~10 $cm^{-1}$ is detected in a continuous area within one of the sampled islands.

The double-resonance process that gives rise to the 2D band has been used to distinguish monolayer and two-layer graphene. For cleaved graphene, the 2D band is defined largely by the dispersion and splitting of electronic bands at the Brillouin zone boundary: a single peak is observed for monolayer graphene, whereas interlayer coupling splits the band into four distinct components for bilayer graphene. The 2D band of two-layer epitaxial graphene on Ru(0001) shows a single peak that is broadened (full-width at half-maximum 42 $cm^{-1}$) with respect to that of monolayer graphene on $SiO_2$ (full-width at half-maximum 38 $cm^{-1}$). The observation of a single narrow peak suggests that the two-layer samples closely match the electronic structure of cleaved monolayer graphene, with very little observable band splitting due to interaction of the second layer with the underlying graphene layer and Ru metal. Thus, the controlled addition of further epitaxial graphene layers may be used to realize the properties of bilayer and few-layer graphene.

The frequencies and intensity ratios of the G and 2D peaks observed for two-layer graphene on Ru(0001) in FIG. 4A are consistent with results obtained on cleaved graphene, the carrier density of which is increased by a gate-induced electric field as disclosed, for example, by J. Yan, et al. in "*Electric Field Effect Tuning of Electron-Phonon Coupling in Graphene*," Phys. Rev. Lett. 98, 166802 (2007) and S. Pisana, et al. in "*Breakdown of the Adiabatic Born-Oppenheimer Approximation in Graphene*," Nature Mater. 6, 198 (2007), each of which is incorporated by reference in its entirety as if fully set forth in this specification. This suggests that the Fermi level in the epitaxial two-layer graphene is shifted away from the Dirac point. Chemical doping—reflecting a residual interaction with the underlying metal, indicated by the spacing of the first and second graphene layers and varying slightly across the graphene sheets (FIGS. 4B and 4C)—is the most likely cause.

Both the structural data from I(V) LEEM and the coupled vibrational and electronic signatures in Raman spectroscopy indicate that the second-layer epitaxial graphene on Ru(0001) is strongly decoupled from the metal substrate. This decoupling should also be reflected in the interlayer electronic transport. To evaluate carrier transport through epitaxial graphene stacks, room-temperature four-probe transport measurements were performed in UHV using a commercial system produced by Omicron Nanotechnology which enables positioning of four independent probe tips with nanometer accuracy on the sample while observing the process by field-emission (FE) SEM. The probes consisted of electrochemically sharpened tungsten wires mounted on and manipulated by piezoelectric actuator elements, and projecting at an angle of 45° onto the sample surface. Their tips were placed above selected epitaxial graphene structures, biased relative to the sample, and then approached individually until a tunneling current was detected. From this tunneling contact, the tips were carefully brought into mechanical contact, as judged from the onset of linear low-bias four-probe current-voltage characteristics.

An UHV-SEM image of the arrangement of the four contact probes for interlayer resistance measurements is shown in FIG. 5A. Measurements were carried out for two different probe configurations: $G_2 \rightarrow G_1$, two probes each on the first and second graphene layer for measuring transport between graphene sheets; and $G_1 \rightarrow G_1$, all four probes on the first graphene layer. At identical probe spacing, the measured intralayer and interlayer resistances differ significantly. For voltage probes (2, 3) separated by about 10 µm (as shown in FIG. 5A), transport in the first graphene layer ($G_1 \rightarrow G_1$) shows a resistance of (10±1) Ω. The interlayer resistance ($G_2 \rightarrow G_1$) is higher by about a factor of $10^3$, that is, the electronic coupling between the graphene layers—hence also between the second graphene sheet and the Ru substrate—is weak.

The electronic interaction between sheets with exposed π orbitals is important in a variety of contexts. It determines the anisotropy between the in-plane and c-axis conductance of bulk graphite, affects electronic transport in multiwall carbon nanotubes and nanotube bundles, and governs charge transfer in junctions containing π-conjugated molecules. Depending on the alignment of adjacent layers, the interlayer transport involves either hopping or tunneling between adjacent π orbitals. The coupling mechanism can, in principle, be identified by measuring the interlayer resistance as a function of layer spacing. Early experiments on graphite subjected to high hydrostatic pressures indeed showed a lowering of the c-axis resistance at high pressure. A similar type of measurement can be conducted on individual micrometer-sized graphene domains using our nanomanipulated electrical probes as shown in FIGS. 5B through 5D.

A cross-sectional schematic illustration showing the four-probe transport measurement between first- and second-layer epitaxial graphene ($G_2$-$G_1$) using probes 1 and 2 for local mechanical deformation of $G_2$ is shown in FIG. 5B. With probes 3 and 4 placed on $G_1$, probes 1 and 2—in contact with $G_2$—are moved along the sample normal to deform $G_2$. The relative stiffness of the tungsten probe tip and the graphene layer generates a large mechanical advantage, n, in the range $10^2$-$10^3$, that is, a sub-angstrom deformation of $G_2$ can be induced controllably by an n-fold larger displacement of the tip actuator. Measurements during loading and subsequent unloading coincide exactly, demonstrating that the graphene sheet is strained elastically in this process. Reference measurements with all four probes placed on $G_1$ showed no change in electrical characteristics over a much larger range of loading.

FIGS. 5C and 5D show the four-probe resistance as a function of the spacing between $G_2$ and $G_1$. For low bias voltages (a few millivolts), all measured current-voltage characteristics $I_{1,4}(V_{2,3})$ are linear. The interlayer resistance varies exponentially with the deformation of $G_2$, from which direct tunneling between π-orbitals on the adjacent graphene sheets is identified as the conduction mechanism. The measured resistance is fit using a one-dimensional tunneling model, $I \propto V \exp(-2d\sqrt{2m_e\phi}/\hbar)$, where d and φ are the width and constant height (at low V) of the tunneling barrier, respectively, and $m_e$ denotes the electron (effective) mass. Assuming $m_e = m_o$, we find a barrier height of 5.0 eV, consistent with very weak electronic interlayer coupling of the undeformed graphene stack at room temperature.

The experiments on this specific model system—single- and two-layer graphene grown epitaxially on a Ru(0001) template—provide evidence for the feasibility of synthesizing large monocrystalline epitaxial graphene domains. A comparison with graphene on SiC, the epitaxial system that has received the most attention thus far, shows surprisingly similar substrate interactions in both cases: a first graphene layer is spaced closely (1.45 Å for Ru; 1.65 Å for 4H-SiC (000$\bar{1}$)) and interacts strongly with the substrate, as reflected by a drastic suppression of the work function. The substrate-first layer separation for the 4H-SiC (000$\bar{1}$) surface has been reported, for example, by F. Varchon, et al. in "*Electronic Structure of Epitaxial Graphene Layers on SiC: Effect of the Substrate*," Phys. Rev. Lett. 99, 126805 (2007) and by A. Mattausch, et al. in "*Ab Initio Study of Graphene on SiC*," Phys. Rev. Lett. 99, 076802 (2007) each of which is incorporated by reference in its entirety as if fully set forth in this specification.

The first graphene layer, which will have distinct electronic and chemical properties that are yet to be explored, may be seen as a buffer layer supporting the second graphene sheet that is largely decoupled structurally and electronically, but is doped owing to residual charge transfer from the substrate. Significant differences between graphene epitaxy on Ru(0001) and SiC clearly lie in the process conditions and in the level of structural control achievable. Si sublimation on SiC at high temperatures (between 1,250° C. and 1,450° C.) apparently leads to small (<1 µm) multilayer graphene nuclei. Epitaxy on Ru(0001) at lower temperatures (~850° C.) produces sparse arrays of graphene nuclei that grow in a controlled layer-by-layer mode to macroscopic dimensions.

II. Exemplary Embodiment 2—Growth on Planar Thin Films

Polycrystalline Ru films with thicknesses ranging from 50 to 500 nm were grown on well degassed $SiO_2$(300 nm)/Si substrates by rf magnetron sputtering of a Ru target (99.95% purity) in an UHV system with a base pressure of $2 \times 10^{-10}$ torr. The substrate temperature during the Ru film deposition was 700° C. and the growth rate 0.06 nm/s. Following the growth, the Ru films were annealed at 950° C. in UHV for 20 min. Graphene epitaxy on Ru films was performed as on Ru(0001) single crystals, described in detail above. Briefly, the Ru thin films were enriched with interstitial C by exposure to ethylene ($5 \times 10^{-7}$ torr) at 950° C., followed by slow cooling in UHV to 550° C. The gradual lowering of the temperature reduces the C solubility in the Ru film and causes C segregation, driving graphene nucleation and growth at the surface. The morphology of the Ru films and the graphene layer were investigated in situ by STM in a microscope attached to the growth system, and ex situ by TEM of cross sections of the films in a JEOL JEM 2100F microscope.

Figure 6B:
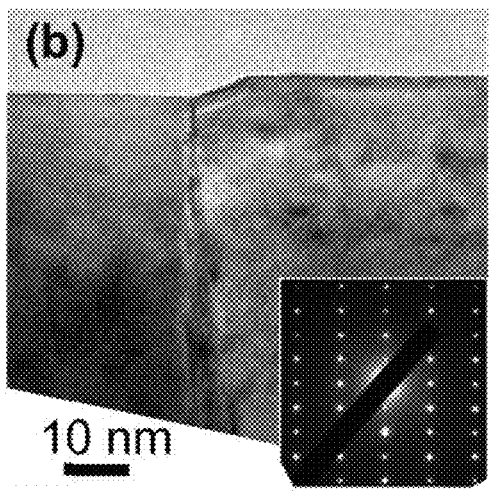
FIG. 6B is a TEM image of two Ru grains and the grain boundary that separates them. The inset shows the diffraction pattern from a Ru grain taken along the [2$\bar{1}\bar{1}$0] axis.
Figure 6C:
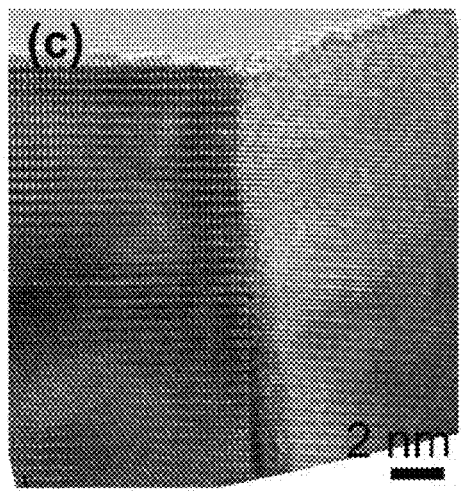
FIG. 6C is a high-resolution TEM (HRTEM) image of the Ru grain material and the grain boundary shown in FIG. 6B.

The morphology and structure of a typical Ru thin film on $SiO_2$, used as a template for graphene growth, are shown in FIGS. 6A through 6C. The overview XTEM image in FIG. 6A shows that the Ru film is polycrystalline with typical grain size ~0.5-0.6 µm and has a somewhat wavy but sharp interface with the amorphous $SiO_2$ layer of the substrate. The columnar Ru grains have uniform diameters over the entire film thickness, sharp grain boundaries, and particularly flat top surfaces, as seen in FIG. 6B. Electron diffraction (inset in FIG. 6B) reflects the hcp crystal structure, high crystalline quality, and preferential (0001) orientation of the grains. High-resolution imaging (see FIG. 6C) corroborates that the grains grow with the c-axis perpendicular to the $SiO_2$ surface plane and show the c-spacing of bulk Ru (4.28 Å). Adjacent grains share low-angle tilt grain boundaries with average 3-4° misorientation between the [0001] directions of adjoining Ru grains.

Figure 7A:
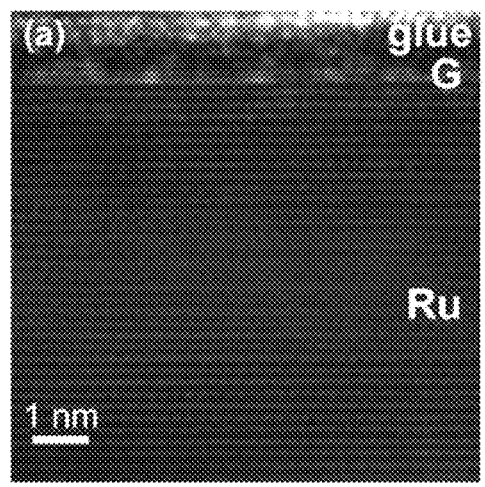
FIG. 7A is a XTEM image close to the graphene/Ru interface.
Figure 7B:
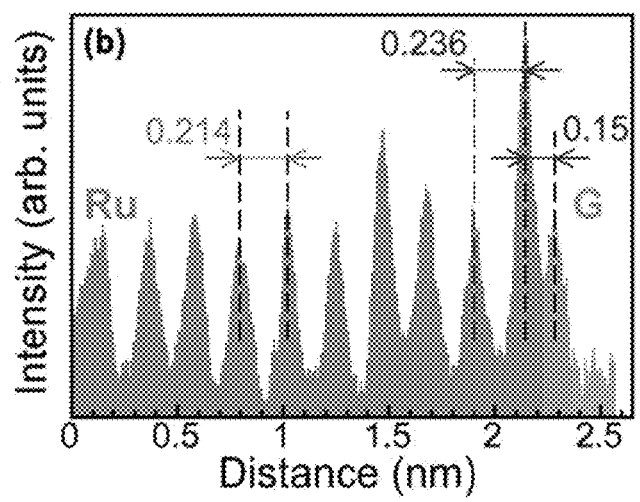
FIG. 7B is a line profile showing the lattice spacing of the 10 topmost Ru lattice planes and the graphene layer.

The graphene layer formed on top of the Ru film is shown in the high-resolution TEM image of FIG. 7A, which images the Ru lattice planes near the surface as well as the graphene monolayer. The image shows that the Ru lattice planes are straight, parallel to the surface, and equidistant. The line profile in FIG. 7B of the topmost 10 Ru planes confirms that their spacing is indeed constant (2.14 Å). The only deviation from this value is observed between the surface and first subsurface Ru lattice planes, which are spaced further apart (2.36 Å), likely due to out-of-plane surface relaxation. The graphene layer shows different contrast and appears slightly wavy. The average spacing between the Ru surface plane and the graphene is measured to be 1.5 Å, consistent with the separation of (1.45±0.1) Å between the Ru substrate and the first graphene layer on Ru single crystals determined by I(V) LEEM and x-ray diffraction (XRD). The slight waviness may be due to the height variations within the moiré structure depending on the local registry of the carbon atoms with the surface Ru atoms.

Figure 8A:
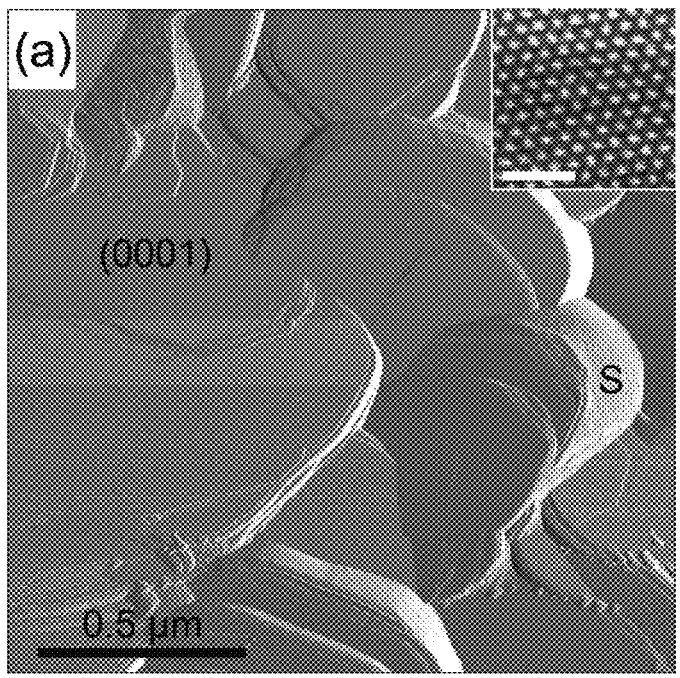
FIG. 8A is a STM image showing the surface morphology of the polycrystalline Ru film grown on $SiO_2$ and the continuous graphene layer formed on it (V=+0.4 V, I=0.2 nA). The inset shows a higher magnification view of the graphene/Ru moiré structure (scale bar: 10 nm).

The morphology of the graphene layer on the polycrystalline Ru film was investigated in-situ by STM. An overview STM image of graphene on a 500-nm-thick polycrystalline Ru film covered by monolayer graphene is shown in FIG. 8A. This image shows clearly the surface morphology of the Ru film and confirms the characteristics observed in TEM: large, flat surfaces of the individual grains, and lateral grain sizes of about 0.5 μm. Indeed, the surface within grains appears atomically flat with no or very few surface steps, while higher step bunches (S) are occasionally observed near grain boundaries. On Ru(0001), single layer graphene adopts a moiré structure due to the superposition of the crystal structure of the underlying Ru and the graphene (see description above). The $\langle 10\bar{1}0 \rangle$ directions of layer and substrate align, and the moiré repeat vectors are $a_m$=(2.93±0.08)nm, equivalent to 10.8±0.3 times the nearest-neighbor distance on Ru(0001). Since polycrystalline Ru thin films expose flat (0001) facets, monolayer graphene grown on the Ru films should show a similar moiré structure as on Ru(0001) single crystals. This is indeed the case, as seen in the inset of FIG. 8A. The graphene monolayer exhibits a highly ordered moiré structure that has no visible defects even over large sample areas, mapped by large-scale (several μm$^2$), high-resolution (0.1 nm) STM images showing a moiré pattern throughout. Hence, we deduce that the crystalline quality of the graphene layer is high. Importantly, the graphene forms a closed layer with, uniform monolayer thickness, despite the presence of grain boundaries in the polycrystalline Ru film.

Figure 8B:
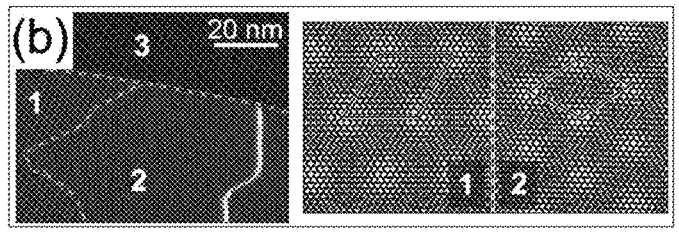
FIGS. 8B and 8C are STM images of the moiré structure over different Ru grains and the grain boundaries that separate them. The panels on the right show models of the abrupt change in the moiré resulting from an in-plane rotation of the Ru lattice across a grain boundary.
Figure 8C:
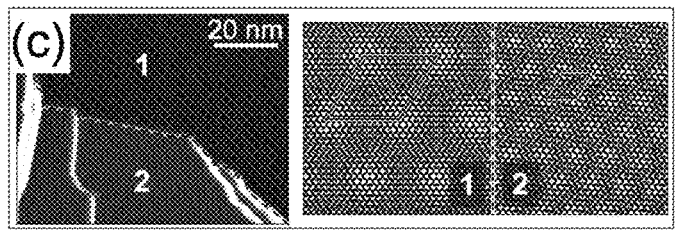
Figure 8C:
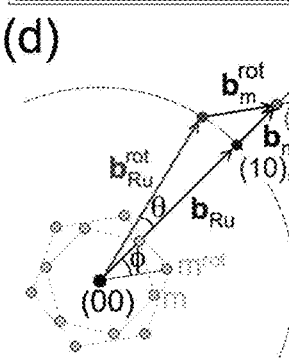
Figure 8C:
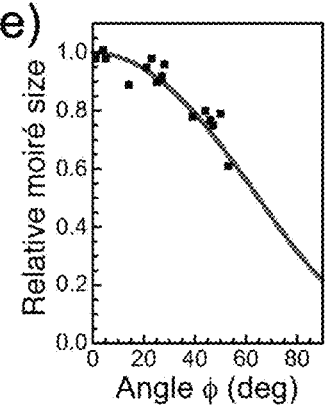

On Ru(0001) single crystals, the graphene moiré pattern has the same orientation and periodicity over the entire substrate. This finding suggests that the particular moiré structure observed on Ru(0001) is the structure with lowest energy, and is therefore strongly preferred over other possible interface geometries. In contrast, we find that on polycrystalline Ru graphene the moiré pattern can display abrupt changes in both orientation and periodicity. Two examples of this effect are shown in FIGS. 8B and 8C. Areas covered by moiré structures with different orientation and period are separated by sharp boundaries (dashed lines). As we will show below, these changes in the moiré can be used to prove that monocrystalline graphene domains are structurally coherent and continuous across grain boundaries in the Ru thin film.

Given that a moiré results from the superposition of two lattices, an abrupt change in the moiré pattern of monolayer graphene on Ru could have several possible causes. One possibility, a change in the crystal structure, e.g., in-plane orientation, of the graphene overlayer, would imply the formation of crystallographic defects along the domain boundary, which we do not observe by STM. A change in the crystal structure or surface orientation (exposed facet) of the underlying Ru grains could also give rise to modifications in the moiré. However, our TEM investigation has established that the crystal structure and (0001) grain orientation is the same throughout the Ru film. The only variation observed by TEM is a small misalignment of the [0001] surface normal direction of adjacent grains, which would not give rise to a change of the moiré orientation and periodicity. Another possibility, which cannot be detected by cross-sectional TEM, is an in-plane rotation of the Ru(0001) lattice in adjacent grains. A continuous graphene sheet crossing a boundary between two Ru grains with in-plane misalignment would cause an abrupt change in the moiré periodicity and orientation, as shown in the STM images and simulations of FIGS. 8B and 8C. FIG. 8B shows a change in moiré between grains 1 and 2 in which both the orientation and the periodicity change: the moiré spacing is reduced from 24 Å to 17 Å, accompanied by a relative rotation of 26°. FIG. 8C shows a change in moiré between grains 1 and 2 in which the orientation is approximately preserved, but the period is reduced to 16 Å. The models on the right of both panels reveal that rotations around the [0001] axis of the Ru atomic lattice by angles θ=5° and θ=10°, respectively, reproduce the rotation and scaling of the moiré pattern in the two cases. Hence, the observed changes would be obtained by simply rotating the in-plane Ru grain orientation underneath a continuous graphene sheet.

A general expression for the relative rotation and scaling of the graphene/Ru moiré can be found by considering the structure in reciprocal space. (See, e.g., J. Coraux, A. T. N'Diaye, M. Engler, C. Busse, D. Wall, N. Buckanie, F. J. Meyer zu Heringdorf, R. van Gastel, B. Poelsema, and T. Michely, *New Journal of Physics* (2), 023006 (2009), which is incorporated by reference in its entirety as if fully set forth in this specification.) The schematic of FIG. 8D shows that a relative in-plane rotation of the Ru and graphene lattices by an angle θ gives rise to a new moiré structure that is rotated relative to the original (aligned) moiré by an angle φ, and scaled from an original (reciprocal) lattice vector $b_m$ to a new vector $b'_m$ (the real-space basis vectors have length $|a_m|=4\pi/\sqrt{3}\ |b_m|$). The result is a one-to-one relationship between the rotation and scaling of the moiré in real space, as plotted in FIG. 8E. Also shown in FIG. 8E are measurements of the moiré orientation, φ, and scaling—relative to a small area with a moiré structure close to that found for graphene on Ru(0001) single crystals—for different regions of the surface mapped by the large STM scan of FIG. 8A. The measurements closely follow the expected relationship between moiré angle and periodicity, demonstrating that the entire area shown in FIG. 8A is covered by a single, continuous sheet of monolayer graphene that seamlessly flows between Ru grains with small misalignments of their in-plane orientations. It has been shown above that graphene accommodates atomic steps on single crystalline Ru(0001) by a carpet-like flow. Our analysis for polycrystalline Ru thin films shows that grain boundaries are accommodated by a similar, carpet-like flow, and that a graphene domain can continue its growth over many Ru grains, albeit with a varying interfacial structure. Hence, the extension of individual graphene domains on polycrystalline Ru is not limited by the grain size of the metal film.

III. Exemplary Embodiment 3—Growth on Non-Planar Thin Films

Figure 9A:
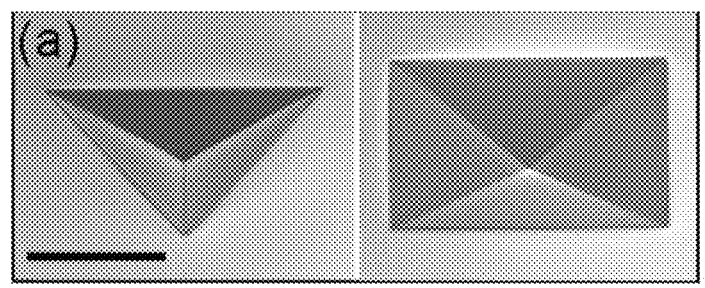
FIG. 9A reproduces two SEM images (tilted 52° with respect to the horizontal axis) showing examples of 3D etch profiles milled on a silicon substrate: inverted tetrahedron (left) and inverted square pyramid (right). The scale bar measures 5 μm.
Figure 9B:
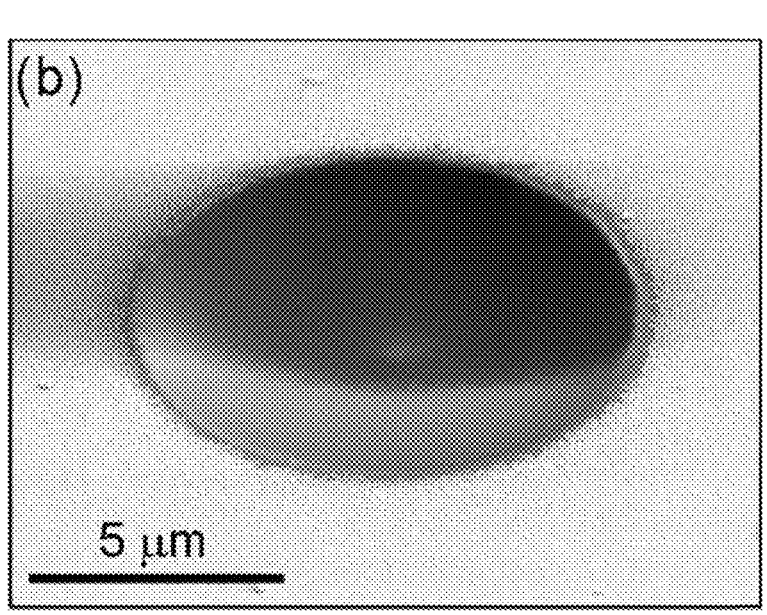
FIG. 9B is a SEM image (tilt=52°) of an inverted spherical cap milled in a fused silica substrate.
Figure 9C:
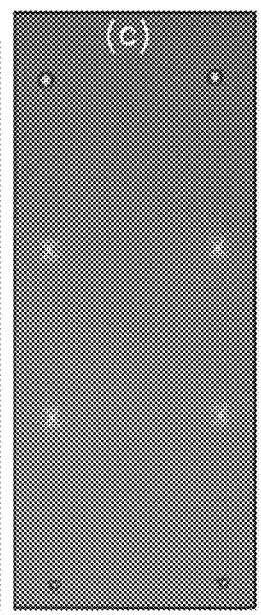
FIG. 9C is an optical micrograph of an array of structures milled on fused silica after removal of the Au coating required for milling.
Figure 11B:
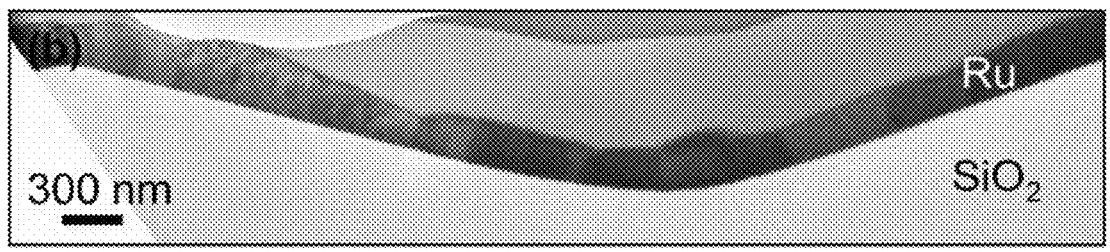
FIG. 11B is a XTEM image showing the structure of the Ru film along the cut represented by the top line in FIG. 11A.

Arrays of three-dimensional geometric indents with different shapes—inverted tetrahedrons, square pyramids, and hemispheres—were designed and micromachined in fused silica substrates by focused ion beam (FIB). FIGS. 9A through 9C are micrographs of 3D geometrical indented patterns prepared by FIB milling. In FIGS. 9A and 9B the images were taken in a scanning electron microscope at a tilt of 52° with respect to the horizontal axis; the scale bars correspond to 5 µm. The left panel of FIG. 9A shows an inverted tetrahedron while the right panel shows an inverted square pyramid. Both were milled on a silicon substrate. Similar results, not shown, were obtained on fused silica substrates. FIG. 9B shows an inverted spherical cap milled in a fused silica substrate. The grain structure at the flat surface corresponds to the Au coating needed to reduce charging effects during milling. FIG. 9C is an optical micrograph of an array of test structures milled on fused silica after removal of the Au coating. The top row corresponds to inverted spherical cap structures, the two central rows show inverted square pyramids, and the bottom row displays inverted tetrahedrons.

Patterns consisting of mathematically-defined 3D etch profiles were milled using a dual-beam SEM/FIB system (Helios Nanolab from FEI Company). The control of the ion beam position and exposure dose was performed by a lithography system (NPGS from JC Nabity Lithography Systems), which reproduced a desired etch profile by directing a 30 keV focused ion beam at position (x,y) for a time equal to $t=z\Delta x\Delta y/IV_D$, where $z=f(x,y)$ is the etch depth function, $\Delta x\Delta y$ is the area defined between consecutive exposure points, I is the ion beam current and $V_D$ is the volume of material removed per exposure dose. The fused silica substrates used in this work required a Au sputter coating (~25 nm) and grounded metal clips in contact with the Au layer to reduce charging effects during milling. FIG. 9B shows an inverted spherical cap structure milled in fused silica ($z_{max}=1$ µm, $\Delta x\Delta y\approx 100$ nm$^2$, I=93 pA and $V_D\approx 0.24$ µm$^3$/nC). Once the patterns were milled, the Au coating was removed by dipping the substrates in aqua-regia (3 HCl:1 HNO$_3$) for 1 minute at room temperature. FIG. 9C displays a region of an array of structures milled on fused silica after removal of the Au coating.

Polycrystalline Ru films with thickness of ~200 nm were then grown on the patterned substrates by rf magnetron sputtering of a Ru target (99.95% purity) in an UHV system having a base pressure of 2×10$^{-10}$ torr. The substrate temperature during the Ru film deposition was 660° C. and the growth rate was 0.06 nm/s. Following the Ru film growth, graphene epitaxy was performed at 800° C., followed by cooling at a rate of 15° C./min according to the procedure described above. The morphology of the Ru films and the graphene layers on the patterned fused silica were characterized in situ by STM and ex situ by SEM and cross-sectional transmission electron microscopy (XTEM). For the XTEM, thin sections across the patterns were prepared by lift-off and thinned by FIB.

Figure 10A:
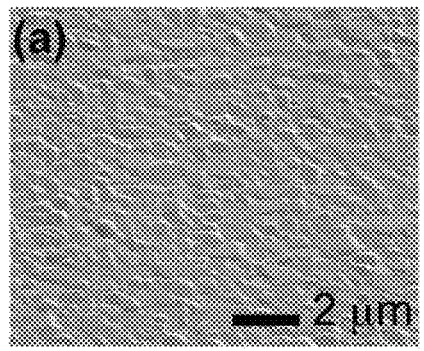
FIGS. 10A through 10D are field-emission (FE) SEM images representative of the morphology of the Ru film (200 nm thick) grown on fused silica substrates. Distributions of grain sizes in the corresponding patterns are shown to the right of each micrograph.
Figure 10A:
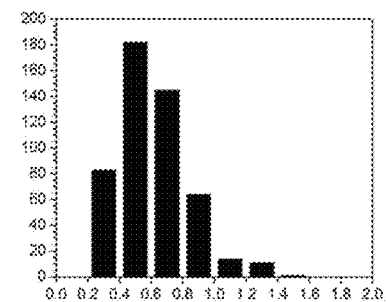
Figure 10B:
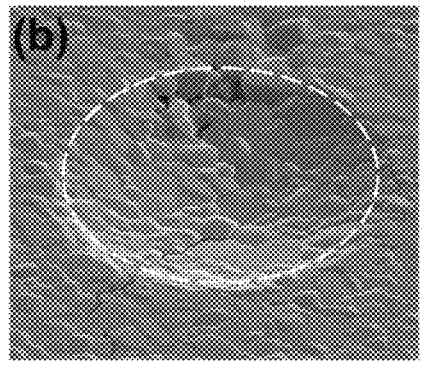
Figure 10B:
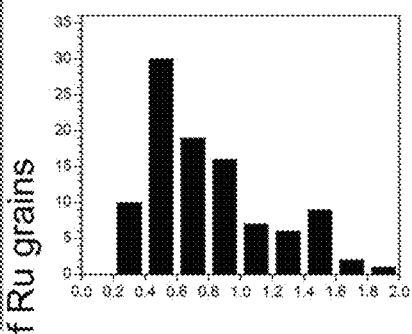
Figure 10C:
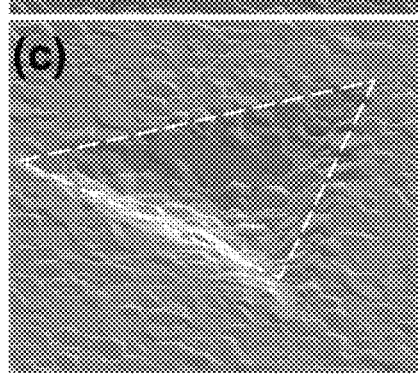
Figure 10C:
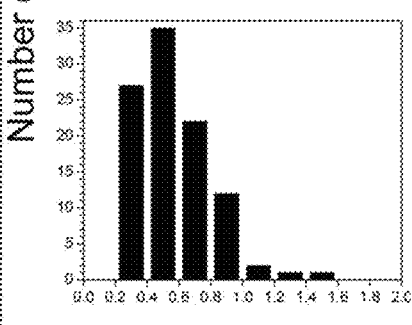
Figure 10D:
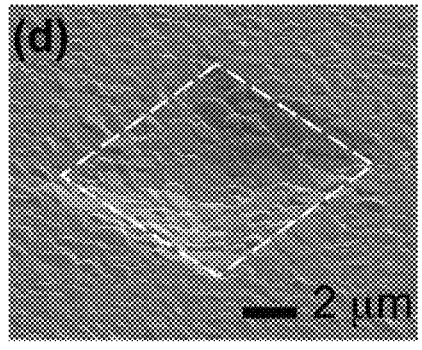
Figure 10D:
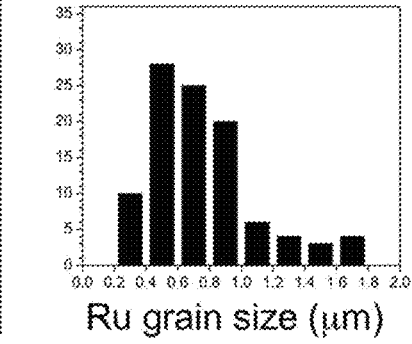
Figure 11A:
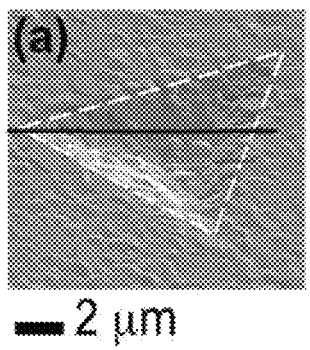
FIG. 11A is a FESEM image of polycrystalline Ru film on an inverted tetrahedron patterned in fused silica.
Figure 11C:
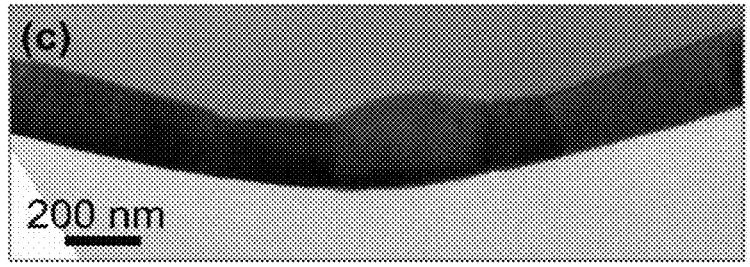
FIG. 11C shows a TEM image of the Ru grains at the bottom of the tetrahedral structure (bottom left line in FIG. 11A).
Figure 11D:
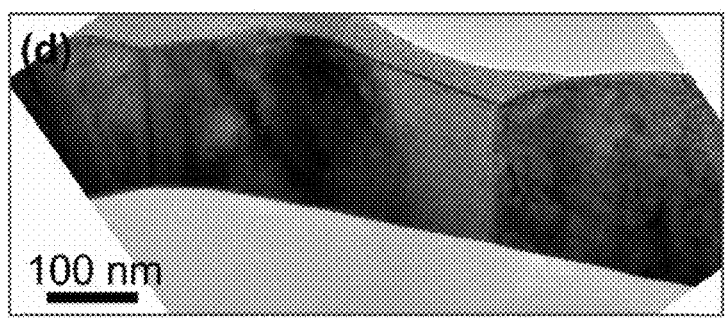
FIG. 11D shows a TEM image close to the edge of the tetrahedral structure (bottom right line in FIG. 11A).

FIGS. 10A through 10D show representative field-emission (FE) SEM images of the graphene monolayer on Ru film deposited on a fused silica substrate in which arrays of 3D geometrical indented patterns were micromachined by FIB. The FESEM images show the characteristics of the Ru film, while the MLG structure was investigated by STM (see below). The FESEM image of the Ru film from the planar surface areas surrounding the arrays of indents is shown in FIG. 10A. The Ru film on each of the three classes of indents patterned, i.e., inverted hemisphere, tetrahedron, and square pyramid, are shown in FIGS. 10B through 10D, respectively. The FESEM images show that the graphene/Ru film homogeneously coats the entire surface of the fused silica surface—the planar areas as well as the patterned structures. The continuous Ru layer is polycrystalline with densely packed grains similar to Ru films grown on planar SiO$_2$/Si substrates. (See, e.g., E. Sutter, P. Albrecht, and P. Sutter, "*Graphene Growth on Polycrystalline Ru Thin Films*", Appl. Phys. Lett. 95, 133109 (2009), which is incorporated by reference in its entirety as if fully set forth in this specification.) The prevalence of the Ru grains on the planar areas reveal grain sizes between 0.3 and 0.9 µm; the mean size is ~0.5 µm (FIG. 10A). On the patterned surfaces, a large number of grains have diameters around 0.5 µm, but the grain size distribution shifts significantly towards larger sizes. A number of grains grow to sizes up to 2µm; the mean size is ~0.8-0.9 µm (FIGS. 10B through 10D). The majority of the Ru grains on the planar areas and the patterned indents are hexagonal in shape and expose a flat top facet, consistent with the preferential growth along the z-axis established for growth on planar substrates. The grain boundaries are very sharp. While a large number of grains have flat top facets, these facets appear inclined and introduce roughness to the surface of the film. In Ru film growth on SiO$_2$/Si a difference in height between adjacent grains of the order of 5 nm was associated with the formation of step bunches at the grain periphery during the high-temperature annealing step that follows the deposition of the Ru film. These step bunches were inobstructive to the coherent flow of the graphene monolayer over multiple grain boundaries. The topographic fluctuations in height of the Ru film on fused silica are larger, up to 30-40 nm in the surface of the patterns and less on the planar areas, probably due to some nonplanarity of the starting fused silica surface or the Ru grain growth on the patterned surface. The graphene monolayer was seen to be continuous by STM and not perturbed by the fluctuations, as discussed below.

Figure 12A:
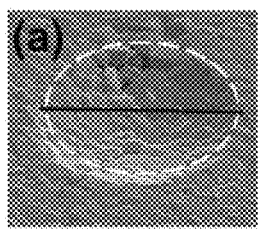
FIG. 12A is a FESEM image of a polycrystalline Ru film grown on an inverted hemisphere patterned in fused silica.
Figure 12B:
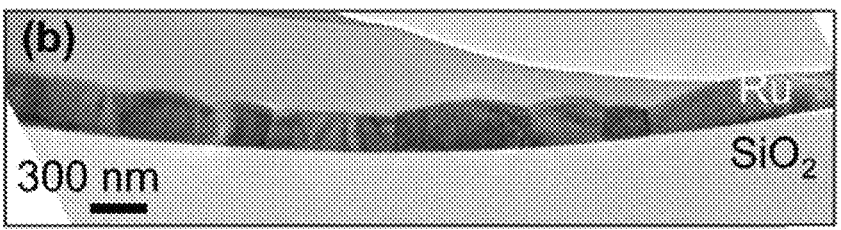
FIG. 12B is a TEM cross-section showing the structure of the Ru film along the cut represented by the line in FIG. 12A.
Figure 12C:
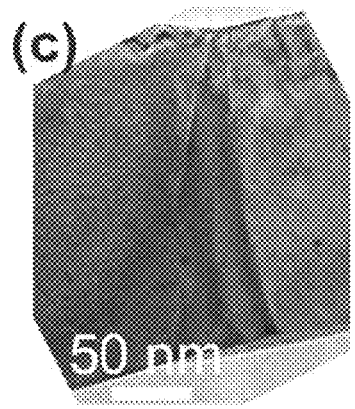
FIG. 12C is a TEM image of two adjacent Ru grains and the grain boundary that separates them.
Figure 12D:
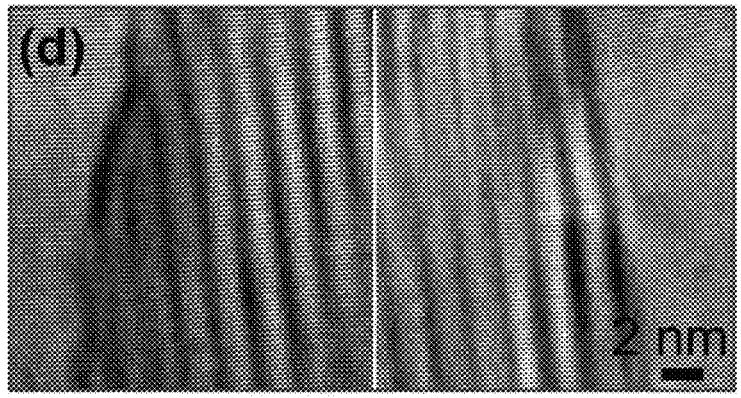
FIG. 12D is a HRTEM image of the Ru grain material and the grain boundary depicted in FIG. 12C.

The morphology of the Ru film on the inverted tetrahedron (lateral size of ~8 µm) is shown in FIGS. 11A through 11D. The overview XTEM image in FIG. 11B corresponds to a cut through the center of the tetrahedron along the direction shown in FIG. 11A (top line). The Ru grains follow closely the surface of the curved substrate within the indented pattern and the interface between the Ru grains and the fused silica support is well defined and sharp. The XTEM images in FIGS. 10C and 10D correspond to cross-sections within (bottom left line in FIG. 10A) and at the periphery of (bottom right line) the indented structure, respectively. The center of the tetrahedral pyramid, where the surface is concave (FIG. 11C), the edge where it is convex (FIG. 11D), as well as the inclined flat transition surfaces are covered with continuous Ru film. The structure of the Ru film in the hemispherical (FIGS. 12A through 12D) and tetrahedral (not shown) indented patterns is very similar. The Ru grains show high crystalline quality and preferential (0001) orientation of the grains. The majority of the grains show flat (0001) top facets nearly parallel to the local substrate surface. Ru films on SiO$_2$/Si consist of columnar Ru grains with uniform diameters over the entire film thickness and particularly flat top surfaces, while on the patterned fused silica some grains with inclined top surfaces and changing diameters are present, as observed in the SEM images discussed above as well. The higher magnification XTEM image in FIG. 12B depicts an example of the extreme diameter decrease—a grain that dies out over the thickness of the Ru film. High-resolution TEM images of the two Ru grains close to their boundary with the diminishing Ru grain are shown in FIG. 12D. Both Ru grains have high crystalline quality and grow with the c-axis perpendicular to the inclined fused silica surface plane. The planes in the grain to the right show a tilt consistent with the variation in substrate inclination over the length of the grains. Even in the grain with diminishing diameter the lattice planes can clearly be resolved. Additional contrast modulations are present probably due to strain. Strain might be the reason for the disappearing of some grains at the expense of the growth of others similar to the self-organization of strained islands in multilayers. (See, e.g., E. Mateeva, P. Sutter, J. C. Bean, and M. G. Lagally, "*Mechanism of Organization of Three-Dimensional Islands in SiGe/Si Multilayers*", Appl. Phys. Lett. 71, 3233 (1997), which is incorporated by reference in its entirety as if fully set forth in this specification.)

Figure 13A:
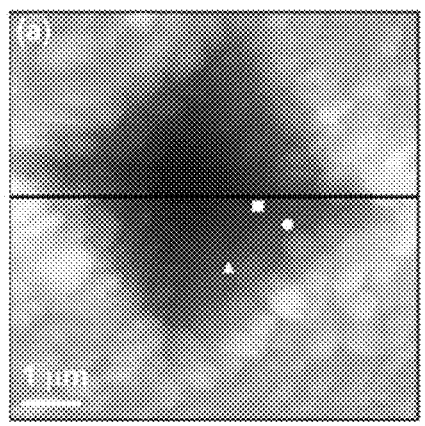
FIG. 13A is a STM image showing the surface morphology of the polycrystalline Ru film grown on a pyramid indented in fused silica and the continuous graphene monolayer formed on it (FOV: 7 μm, V=+2 V, I=1 nA).
Figure 13B:
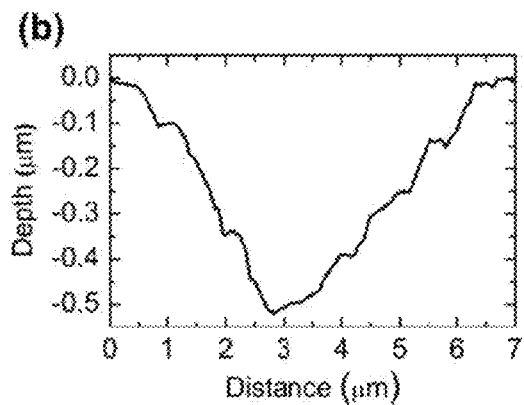
FIG. 13B shows a topographic line profile across the pyramid corresponding to the line in FIG. 13A.
Figure 13C:
FIGS. 13C, 13D, and 13E show higher magnification differential views of the monolayer graphene/Ru moiré structure at three random locations indicated by the square, circular, and triangular symbols, respectively, in FIG. 13A.
Figure 13D:
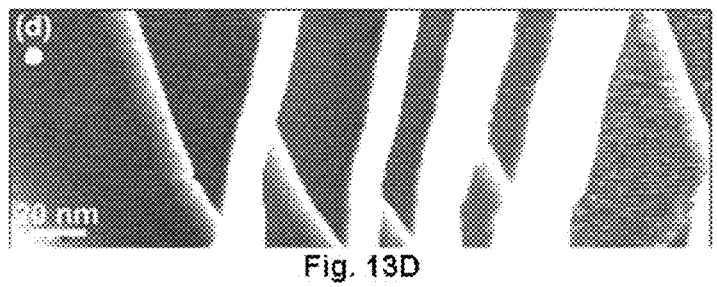
Figure 13E:
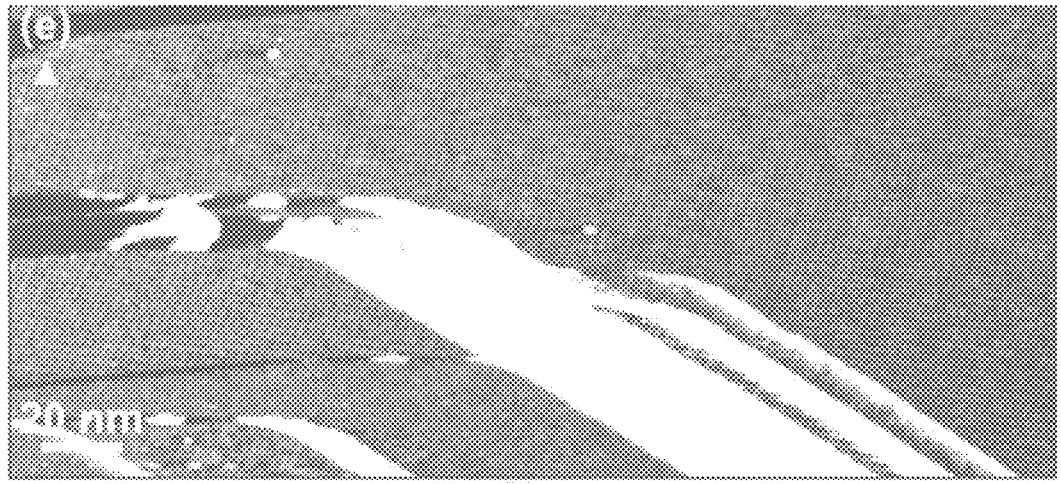

The morphology of the graphene layer on the 200-nm-thick polycrystalline Ru film on the patterned fused silica substrate was investigated in-situ by STM. An overview large area STM image (FOV: 7 μm) of an inverted square pyramid is shown in FIG. 13A. The image confirms the characteristics observed in TEM and SEM: large, flat individual grains, and lateral grain sizes larger than 0.5 μm. A line profile across the pyramidal structure, corresponding to the horizontal line in FIG. 13A, is shown in FIG. 13B. The depth of 0.5 μm agrees with surface profilometry data obtained prior to depositing the 200 nm Ru film. The surface within grains appears atomically flat with no or very few surface steps, while higher step bunches are observed near grain boundaries. Higher-resolution STM images were taken at multiple locations within the pyramid to investigate graphene growth on the Ru film on the inclined sidewalls. FIGS. 13C through 13E show details of the surface at three random locations indicated by the square, circular, and triangular symbols, respectively, in FIG. 13A. On the flat surface as well as on step bunches at the grain boundaries we observe the moiré structure (periodicity of ~3 nm) characteristic of monolayer graphene on Ru(0001) that appears due to the superposition of the lattices of graphene and of the underlying Ru. The graphene monolayer exhibits a highly ordered moiré structure that has no visible defects even over large sample areas. Importantly, the graphene forms a closed layer with uniform monolayer thickness, observed previously in the case of planar $SiO_2$/Si substrates on the topographically curved surfaces. Neither uncovered areas—which would be easily detected by the absence of the conspicuous moiré structure—nor any bilayer or thicker graphene islands were observed, from which we conclude that the graphene has uniform monolayer thickness, similar to the case of growth on planar Ru films on $SiO_2$/Si substrates and resulting from the strong interaction of the interfacial graphene layer with the metal substrate.

To investigate the surface passivation and Ru oxidation protection provided by the single atomic graphene layer, we performed X-ray photoemission spectroscopy (XPS), both in-situ on the as-grown MLG/Ru as well as after ambient exposure for several hours. The O 1s and Ru 3d XPS spectra of the MLG/Ru immediately after growth and following the exposure to air are compared in FIGS. 14A and 14B (Spectra 1 and 2). While in the as-grown MLG/Ru, the O 1s photoemission signal is at the detection limit, a weak but detectable O 1s peak is present following exposure to ambient air (FIG. 14A). The air exposure does not affect the spectral shape of the Ru 3d peak for the MLG/Ru system, but merely causes a slight suppression of the Ru 3d intensity (FIG. 14B). For the bare Ru surface, exposure to air leads to strongly bound oxygen adsorbates that give rise to a strong O 1s photoemission signal and desorb only above ~650° C. (See, e.g., T. E. Madey, H. A. Engelhardt, and D. Menzel, *Surf Sci*. 48, 304 (1975), which is incorporated by reference in its entirety as if fully set forth in this specification.) However, when the Ru surface is protected by MLG the O 1s peak is weak and the species that give rise to the oxygen signal can be desorbed at low temperature. Indeed, a low-temperature anneal to 250° C. for 30 min. in UHV reduced the O 1s peak intensity back to the detection limit, while the Ru 3d peak regained its original intensity (FIGS. 14A and 14B, spectrum 3). This observation leads us to conclude that ambient exposure merely causes the buildup of weakly bound oxygen-containing species on the graphene surface, while the graphene monolayer acts as an inert protective coating efficient in preventing the reaction of the Ru surface with ambient gases.

IV. Applications of Epitaxial Graphene

The findings disclosed in this specification open up a number of avenues for exploiting graphene epitaxy on transition-metal templates. The large first-layer graphene domains may be isolated by suitable etch processes which selectively remove the Ru substrate without damaging the graphene layer. Alternatively, the weakly bound second graphene layer may be transferred to another substrate by using, for example, intercalation to further weaken the interlayer bonding as disclosed, for example, by M. S. Dresselhaus, et al. in "*Intercalation Compounds of Graphite*," Adv. Phys. 51, 1-186 (2002) which is incorporated by reference as if fully set forth in this specification. Both processes are analogous to the layer transfer method used successfully for other electronic materials such as germanium (Ge) and strained silicon (Si) as disclosed, for example, by C. Maleville, et al. in "*Smart-Cut Technology: From* 300 *mm Ultrathin SOI Production to Advanced Engineered Substrates*," Solid State Electron. 48, 1055 (2004) which is incorporated by reference in its entirety as if fully set forth in this specification.

Another possibility is the integration of graphene with other materials by using lithographically patterned transition-metal pads as a catalyst and template for directed local graphene growth. A similar seeding approach using catalytic Au nanoparticles has been established recently to assemble highly ordered few-layer graphene sheets conformally on semiconductor nanowires. This has been demonstrated for Ge nanowires by P. Sutter, et al. in "*Dispensing and Surface-Induced Crystallization of Zeptolitre Liquid Metal-Alloy Drops*," Nature Mater. 6, 363 (2007) and for GaN nanowires by E. Sutter, et al. in "*Assembly of Ordered Carbon Shells on GaN Nanowires*," Appl. Phys. Lett. 90, 093118 (2007), each of which is incorporated by reference in its entirety as if fully set forth in this specification.

Bilayer and/or and few-layer graphene domains may also be used as an atomic-layer switch in which the out-of-plane conductance is reversibly altered over three orders of magnitude by tuning the graphene-substrate coupling. In this case, the in-plane carrier transport in epitaxial or cleaved bilayer or few-layer graphene may be controlled by "mechanical gating." That is, electrical transport between graphene layers may be altered by local mechanical deformations of the layer stack. The epitaxial graphene layers formed by the method described in this specification may also find applications in electronics. For example, molecular switches may be formed from a single graphene sheet. Alternatively graphene may be used as one or more components in an electronic device such as the channel material in a field emission transistor as disclosed, for example, in U.S. Patent Appl. Publication No. 2007/0187694 to Pfeiffer which is incorporated by reference in its entirety as if fully set forth in this specification. Since graphene combines a large electrical conductance with very high optical transparency (i.e., low light absorption per graphene sheet), other applications are in transparent contacts to devices such as detectors, light-emitting diodes, lasers, or solar cells.

Monolayer graphene (MLG) on extended Ru (0001) surfaces has also been demonstrated as excellent oxidation barrier for Ru. The system of MLG/Ru is particularly suitable for focusing atomic beams (He and $H_2$) thus providing a high quality mirror—a critical component for the He-atom microscope, the development of which is extremely important as it can provide insight into the structure of biological materials, polymers, and insulators. Similarly, other thin transition metal films on extended surfaces that are exposed to the elements, such as those covering the elliptical mirrors for focusing hard x-rays, telescope mirrors, etc. might benefit from the protective properties of a conformal graphene layer on their surface. The surface of these mirrors is protected by dielectric coatings that have a tradeoff thickness: thick enough to offer efficient protection but at the same time thin enough to not completely alter and degrade the optical properties of the metallic layer of the mirror. A monolayer of graphene may offer enough protection for the surface that needs to be exposed. A mirror may be formed by a substrate of the mirror material conformally coated with a layer of graphene. For example, the substrate may be a bulk piece of transition metal, glass, fused silica, or the like, or it may be a substrate form of a non-mirror material coated with a thin film of mirror material such as a metallic film, silica, glassy carbon, or other mirror material.

It will be appreciated by persons skilled in the art that the present invention is not limited to what has been particularly shown and described hereinabove. Rather, the scope of the present invention is defined by the claims which follow. It should further be understood that the above description is only representative of illustrative examples of embodiments. For the reader's convenience, the above description has focused on a representative sample of possible embodiments, a sample that teaches the principles of the present invention. Other embodiments may result from a different combination of portions of different embodiments.

The description has not attempted to exhaustively enumerate all possible variations. That alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent.

The invention claimed is:

1. A mirror comprising:
   a substrate comprising a thin film of a transition metal deposited on a substrate form, the substrate having a surface exhibiting a curvature operable to focus an incident beam onto a focal plane, wherein the incident beam is chosen from the group consisting of an electron beam, a neutral atomic species beam, and a neutral molecular species beam; and
   a graphene layer conformally adhering to the substrate, the graphene layer operable to protect the substrate surface from degradation due to the incident beam and an ambient environment.

2. The minor of claim 1, wherein the substrate form comprises a fused silica faun.

3. The mirror of claim 1, wherein the incident beam is a beam of atomic helium.

4. The mirror of claim 1, wherein the incident beam is a beam of atomic hydrogen.

5. The mirror of claim 1, wherein the curvature is elliptical.

6. The mirror of claim 1, wherein the curvature is spherical.

7. The mirror of claim 1, wherein the graphene layer comprises less than ten atomic layers of graphene.

8. The mirror of claim 7, wherein the graphene layer is a monolayer of graphene.

9. The mirror of claim 7, wherein the graphene layer comprises two atomic layers.

10. The mirror of claim 7, wherein the graphene layer comprises three atomic layers.

* * * * *